US010754050B2

(12) United States Patent
Kacewicz et al.

(10) Patent No.: US 10,754,050 B2
(45) Date of Patent: Aug. 25, 2020

(54) PORE PRESSURE PREDICTION BASED ON AN INTEGRATED SEISMIC AND BASIN MODELING APPROACH

(71) Applicant: Chevron U.S.A. Inc., San Ramon, CA (US)

(72) Inventors: Marek Kacewicz, Houston, TX (US); Maisha Lara Amaru, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 390 days.

(21) Appl. No.: 15/840,413

(22) Filed: Dec. 13, 2017

(65) Prior Publication Data
US 2018/0284305 A1  Oct. 4, 2018

Related U.S. Application Data

(60) Provisional application No. 62/479,770, filed on Mar. 31, 2017.

(51) Int. Cl.
*G01V 1/28* (2006.01)
*G01V 1/30* (2006.01)
*G01V 99/00* (2009.01)

(52) U.S. Cl.
CPC .............. *G01V 1/282* (2013.01); *G01V 1/301* (2013.01); *G01V 1/303* (2013.01); *G01V 1/306* (2013.01);
(Continued)

(58) Field of Classification Search
CPC ........... G01V 1/282; G01V 2210/6248; G01V 1/301; G01V 1/303; G01V 99/005; G01V 1/306
(Continued)

(56) References Cited

U.S. PATENT DOCUMENTS

| 4,943,950 A | 7/1990 | Beasley et al. |
| 5,200,929 A | 4/1993 | Bowers |

(Continued)

FOREIGN PATENT DOCUMENTS

| CN | 102445709 | 5/2012 |
| WO | 2012/006604 A2 | 1/2012 |
| WO | 2014/130242 A2 | 8/2014 |

OTHER PUBLICATIONS

Helset et al., "Improved Pore Pressure Prediction by Integrating Basin Modeling and Seismic Methods", Search and Discovery Article #90091 © 2009 AAPG Hedberg Research Conference, May 3-7, 2009—Napa, California, U.S.A. (Year: 2009).*

(Continued)

*Primary Examiner* — Ian J Lobo

(57) ABSTRACT

One embodiment of generating a pore pressure prediction through integration of seismic data and basin modeling includes crossplotting seismically derived velocities and effective stress at spatial coordinates; defining seismic transform functions and an uncertainty range from the crossplotting; transforming the seismically derived velocities into calculated effective stress using selected seismic transform functions and calculating pore pressure using an equation transforming the calculated effective stress into calculated pore pressure; identifying a subset of the selected seismic transform functions, where the subset is identified in response to the calculated pore pressure being adequate based on a comparison; using an inverse of the subset to convert the effective stress from the basin model into basin model derived velocities; building a hybrid velocity model by selecting velocities from the basin model derived velocities or from the seismically derived velocities in each region; and generating a digital seismic image using the hybrid velocity model.

29 Claims, 15 Drawing Sheets

(52) U.S. Cl.
CPC .... *G01V 99/005* (2013.01); *G01V 2210/6248* (2013.01)

(58) Field of Classification Search
USPC .......................................................... 367/73
See application file for complete search history.

(56) References Cited

U.S. PATENT DOCUMENTS

| | | |
|---|---|---|
| 6,751,558 B2 | 6/2004 | Huffman et al. |
| 7,280,918 B2 | 10/2007 | Williams |
| 7,355,923 B2 | 4/2008 | Reshef et al. |
| 7,537,058 B2 | 5/2009 | Gullapalli et al. |
| 7,617,051 B2 | 11/2009 | Sayers et al. |
| 7,812,203 B2 | 10/2010 | Balczewski |
| 7,964,150 B2 | 6/2011 | Balczewski |
| 8,098,543 B2 | 1/2012 | Bachrach et al. |
| 8,121,791 B2 | 2/2012 | Lazaratos et al. |
| 8,201,626 B2 | 6/2012 | Balczewski |
| 8,203,907 B2 | 6/2012 | Krebs et al. |
| 8,275,589 B2 | 9/2012 | Montaron et al. |
| 8,861,309 B2 | 10/2014 | Vu et al. |
| 8,902,709 B2 | 12/2014 | Jaiswal et al. |
| 9,207,344 B2 | 12/2015 | Sengupta et al. |
| 9,310,500 B2 | 4/2016 | Kacewicz et al. |
| 2002/0120429 A1 | 8/2002 | Ortoleva |
| 2007/0032955 A1 | 2/2007 | Williams |
| 2008/0102000 A1 | 5/2008 | Balczewski |
| 2008/0165619 A1 | 7/2008 | Bachrach et al. |
| 2009/0303834 A1 | 12/2009 | Sengupta et al. |
| 2010/0074053 A1 | 3/2010 | Jaiswal et al. |
| 2010/0305865 A1 | 12/2010 | Bachrach et al. |
| 2012/0195165 A1 | 8/2012 | Vu et al. |
| 2013/0116928 A1 | 5/2013 | Bachrach et al. |
| 2014/0153367 A1* | 6/2014 | Nealon .................. G01V 1/301 367/73 |
| 2014/0233352 A1 | 8/2014 | Kacewicz et al. |
| 2015/0090455 A1 | 4/2015 | Balczewski |

OTHER PUBLICATIONS

Albertin, Martin; "Effective Stress Modeling Techniques for Estimating Subsalt Velocities"; Abstract, 2006 SEG/EAGE Summer Research Workshop: Subsalt Exploration & Development: Imaging, Interpretation & Drilling.
Bachrach, Ran; "Applications of Deterministic and Stochastic Rock Physics Modeling to Anisotropic Velocity Model Building"; SEG Denver 2010 Annual Meeting, pp. 2436-2440.
Bowers, Glenn L.; "Pore Pressure Estimation from Velocity Data: Accounting for Overpressure Mechanisms Besides Undercompaction"; Feb. 1995, SPE 27488, pp. 89-95.
Eaton, Ben A.; "The Equation for Geopressure Prediction from Well Logs"; 1975, SPE 5544, pp. 1-5, with attached Tables.
Kacewicz, Marek, et al.; "New Integrated Workflows for Improved Pore Pressure Prediction and Seismic Imaging"; Search and Discovery Article #41705, (2015), no page numbers.
Liu, Yangjun (Kevin), et al.; "Basin-Scale Integrated Earth-Model Building Using Rock-Physics Constraints"; The Leading Edge, Feb. 2016, pp. 141-145.
Lopez, Jorge L., et al.; "Integrated Shared Earth Model: 3D Pore-Pressure Prediction and Uncertainty Analysis"; The Leading Edge, Jan. 2004, pp. 52-59.
Petmecky, R. Stephan, et al.; "Improving Sub-Salt Imaging Using 3D Basin Model Derived Velocities"; 2009, Marine and Petroleum Geology, vol. 26, pp. 457-463.
Sayers, C.M.; "Anisotropic Velocity Analysis"; Geophysical Prospecting, 1995, vol. 43, pp. 541-568.
Sayers, C.M., et al.; "Predrill Pore-Pressure Prediction Using Seismic Data"; 2002, Geophysics, vol. 67, No. 4, pp. 1286-1292.
Albertin, Uwe, et al.; "The Time for Depth Imaging"; Oilfield Review, (2002), pp. 2-15.
Dutta, N.C.; "Geopressure Prediction Using Seismic Data: Current Status and the Road Ahead"; Y2K Review Article, Geophysics, (2002), vol. 67, No. 6, pp. 2012-2041.
Epili, Duryodhan, et al; "Improved Subsalt Imaging Using TTI Anistrophy and Reverse Time Migration Scans"; SEG San Antonio 2011 Annual Meeting, pp. 243-247.
Kacewicz, Marek, et al.; "Combining Seismic Inversion with Basin Modeling—An Indonesia Case Study"; SEG New Orleans 2006 Annual Meeting, pp. 2943-2947.
Madatov, A.G., et al.; "The Effective Basin Model Concept and Fast 3-D Overpressure Modelling in Basin Time Scale"; *Becmhuk MITY*, (2005), vol. 8, No. 1, pp. 5-43.
Madatov, A.G.; "The Overpressure Driven Seismic Velocity Response. The Review of Standard Models and Methods for Extraction in the Context of Basin Modelling Approach to Overpressure Prediction"; *Becmhuk MITY*, (2005), vol. 8, No. 1, pp. 84-119.
Notfors, Carl, et al.; "Anisotropic Prestack Imaging in Practice"; 5th Conference & Exposition on Petroleum Geophysics, (2004), pp. 326-328.
Tsvankin, Ilya; et al.; "Seismic Anisotropy in Exploration and Reservoir Characterization: An Overview"; Geophysics, (2010), vol. 75, No. 3, pp. 75A15-75A29.
Chinese Office Action, dated Feb. 6, 2017, during the prosecution of Chinese Application No. 201480002785.4.
International Search Report, dated Aug. 12, 2014, during the prosecution of International Application No. PCT/US2014/014842.
Written Opinion of the International Searching Authority, dated Aug. 12, 2014, during the prosecution of International Application No. PCT/US2014/014842.
Amaru, Maisha, et al.; "Advancements in Integrated Pore Pressure Prediction and Seismic Imaging"; (2017), SEG International Exposition and 87th Annual Meeting, pp. 5676-5680.
Fehler, Mike, et al.; "SEG Advanced Modeling (SEAM): Phase I First Year Update"; (Aug. 2008), The Leading Edge, pp. 1006-1007.
Kacewicz, Marek, et al.; "New Workflow for Defining Seismic Velocity-Effective Stress Transforms Based on an Integrated Seismic/Basin Modeling Approach"; (2017), SEG International Exposition and 87th Annual Meeting, pp. 3607-3610.
International Search Report, dated Jul. 19, 2018, during the prosecution of International Application No. PCT/IB2018/052194.
Written Opinion of the International Searching Authority, dated Jul. 19, 2018, during the prosecution of International Application No. PCT/IB2018/052194.

* cited by examiner

Example of Residual Move-Out Alpha

Example of points for velocity and vertical effective stress extraction in mini-basins with acceptable gather flatness and signal coherence (in white to gray colors Example of Modification Example of No Modification

PORE PRESSURE PREDICTION BASED ON AN INTEGRATED SEISMIC AND BASIN MODELING APPROACH

CROSS-REFERENCE TO RELATED APPLICATIONS

The present application claims priority from U.S. Provisional Patent Application No. 62/479,770, filed on Mar. 31, 2017, the disclosure of which is hereby incorporated by reference in its entirety.

TECHNICAL FIELD

The disclosed implementations relate generally to seismic data processing, and in particular, to systems and methods for pore pressure prediction.

BACKGROUND

Seismic data is processed to create digital seismic images that can be interpreted to identify subsurface geologic features including hydrocarbon deposits. The ability to define the location of rock and fluid properties as well as temperature and pressure conditions in the subsurface are crucial to our ability to make the most appropriate choices for well design, purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment. Good quality seismic velocities typically result in better digital seismic images as well as more accurate pore pressure predictions, which is critical for many applications such as well design, reservoir and seal quality prediction, identification of potential geo-hazards, and subsurface integrity studies.

Lack of reliable velocities and velocity-pore pressure transform functions away from well locations often leads to incorrect pre-drill pore pressure predictions. Typically, velocity-to-pressure transform functions are empirically derived from well data (e.g., (a) Eaton, B. A, 1975, The Equation for Geopressure Prediction from Well Logs, SPE 5544, and (b) Bowers, G., Pore Pressure Estimation From Velocity Data: Accounting for Overpressure Mechanisms Besides Undercompaction, SPE 27488, 1995, p. 89-95, each of which is incorporated herein by reference in its entirety). But each equation is often applicable only to specific rocks and geographic locations due to differences in geologic histories including sedimentation rate, timing of exposure to specific effective stress-temperature conditions, and degree of diagenetic transformations. A number of studies demonstrate that the use of a combination of basin modeling and seismic imaging leads to better digital seismic images ((a) Petmecky, et al., Improving sub-salt imaging using 3D basin model derived velocities, Marine and Petroleum Geology, 2009, 26, p. 457-463, (b) Lopez, J. L., et al., Integrated shared earth model: 3D pore-pressure prediction and uncertainty analysis, The Leading Edge, January 2004, p. 52-59, (c) Kacewicz, et al., New integrated workflows for improved pore pressure prediction and seismic imaging, 2015, Search and Discovery Article #41705 (Kacewicz, et al.), (d) Liu, Y., N. C. Dutta, D. Vigh, J. Kapoor, C. Hunter, E. Saragoussi, L. Jones, S. Yang, and M. A. Eissa, 2016, Basin-scale integrated earth-model building using rock-physics constraints: The Leading Edge, 35, 141-145. each of which is incorporated herein by reference in its entirety). For example, as discussed in U.S. Pat. No. 9,310,500 and Kacewicz, et al., iterative looping between basin modeling and seismic imaging and the utilization of hybrid velocities may lead to more reliable processing velocities, improved seismic image focus, and improved pore pressure predictions. U.S. Pat. No. 9,310,500 is incorporated herein by reference in its entirety. A need continues to exist in the art for improved digital seismic images, and more specifically, for improved pore pressure predictions.

SUMMARY

Various embodiments of generating a pore pressure prediction through integration of seismic data and basin modeling are provided. In one embodiment, a method includes (a) receiving a seismic velocity model; (b) receiving a basin model; (c) extracting at least one convergence parameter from the seismic velocity model; (d) extracting spatial coordinates and seismically derived velocities from the seismic velocity model where the at least one convergence parameter resides within an acceptable threshold corresponding to that convergence parameter; (e) extracting effective stress from the basin model at the spatial coordinates; (f) crossplotting the seismically derived velocities from the seismic velocity model and the effective stress from the basin model at the spatial coordinates; (g) defining seismic transform functions and an uncertainty range from the crossplotting; (h) transforming the seismically derived velocities into calculated effective stress using selected seismic transform functions and calculating pore pressure using an equation transforming the calculated effective stress into calculated pore pressure; (i) identifying a subset of the selected seismic transform functions that closely reproduce well pressure, reside between hydrostatic pressure and lithostatic pressure, or any combination thereof, where the subset is identified in response to the calculated pore pressure being adequate based on a comparison of the calculated pore pressure and validation data, pore pressure derived from the basin model, or any combination thereof; (j) using an inverse of the subset to convert the effective stress from the basin model into basin model derived velocities; (k) building a hybrid velocity model including a plurality of regions by selecting velocities from the basin model derived velocities or from the seismically derived velocities in each region; and (l) generating a digital seismic image using the hybrid velocity model.

In one embodiment, a system of generating a pore pressure prediction through integration of seismic data and basin modeling includes a processor; and a memory communicatively connected to the processor, the memory storing computer-executable instructions which, when executed, cause the processor to perform: (a) receiving a seismic velocity model; (b) receiving a basin model; (c) extracting at least one convergence parameter from the seismic velocity model; (d) extracting spatial coordinates and seismically derived velocities from the seismic velocity model where the at least one convergence parameter resides within an acceptable threshold corresponding to that convergence parameter; (e) extracting effective stress from the basin model at the spatial coordinates; (f) crossplotting the seismically derived velocities from the seismic velocity model and the effective stress from the basin model at the spatial coordinates; (g) defining seismic transform functions and an uncertainty range from the crossplotting; (h) transforming the seismically derived velocities into calculated effective stress using selected seismic transform functions and calculating pore pressure using an equation transforming the calculated effective stress into calculated pore pressure; (i) identifying a subset of the selected seismic transform functions that closely reproduce well pressure, reside between hydrostatic pressure and lithostatic pressure, or any combination thereof, where the subset is identified in response to the calculated pore pressure being adequate based on a comparison of the calculated pore pressure and validation data, pore pressure derived from the basin model, or any combination thereof; (j) using an inverse of the subset to convert the effective stress from the basin model into basin model derived velocities; (k) building a hybrid velocity model including a plurality of regions by selecting velocities from the basin model derived velocities or from the seismically derived velocities in each region; and (l) generating a digital seismic image using the hybrid velocity model.

In one embodiment, a computer-readable medium having computer-executable instructions stored thereon which, when executed by a computing system, cause the computing system to perform a method of generating a pore pressure prediction through integration of seismic data and basin modeling, the method comprising: (a) receiving a seismic velocity model; (b) receiving a basin model; (c) extracting at least one convergence parameter from the seismic velocity model; (d) extracting spatial coordinates and seismically derived velocities from the seismic velocity model where the at least one convergence parameter resides within an acceptable threshold corresponding to that convergence parameter; (e) extracting effective stress from the basin model at the spatial coordinates; (f) crossplotting the seismically derived velocities from the seismic velocity model and the effective stress from the basin model at the spatial coordinates; (g) defining seismic transform functions and an uncertainty range from the crossplotting; (h) transforming the seismically derived velocities into calculated effective stress using selected seismic transform functions and calculating pore pressure using an equation transforming the calculated effective stress into calculated pore pressure; (i) identifying a subset of the selected seismic transform functions that closely reproduce well pressure, reside between hydrostatic pressure and lithostatic pressure, or any combination thereof, where the subset is identified in response to the calculated pore pressure being adequate based on a comparison of the calculated pore pressure and validation data, pore pressure derived from the basin model, or any combination thereof; (j) using an inverse of the subset to convert the effective stress from the basin model into basin model derived velocities; (k) building a hybrid velocity model including a plurality of regions by selecting velocities from the basin model derived velocities or from the seismically derived velocities in each region; and (l) generating a digital seismic image using the hybrid velocity model.

BRIEF DESCRIPTION OF THE FIGURES

Other features described herein will be more readily apparent to those skilled in the art when reading the following detailed description in connection with the accompanying drawings, wherein.

Figure 1:
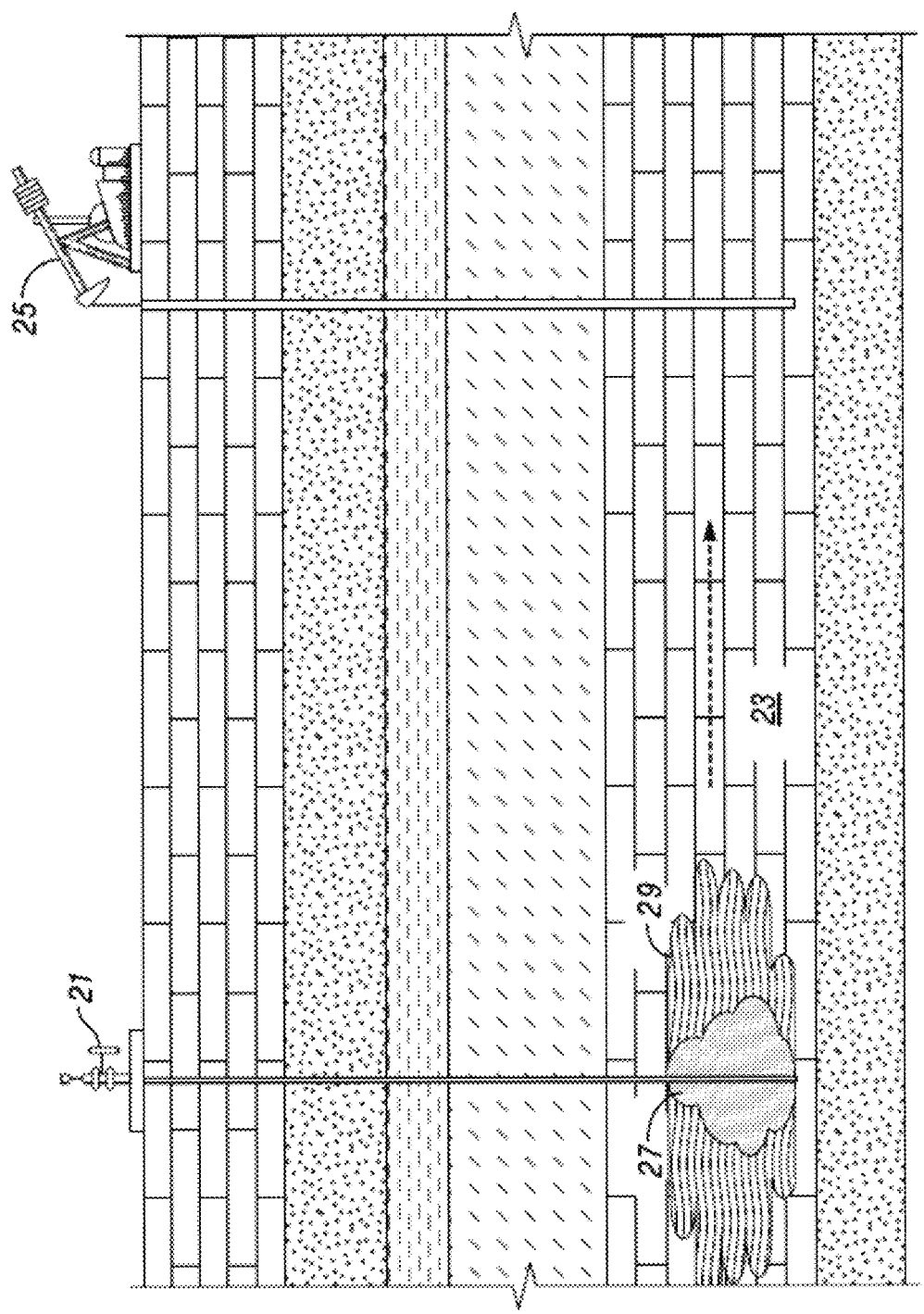
FIG. 1 illustrates a schematic sectional view of one embodiment of a reservoir that is in fluid communication with an injection well and a production well, and the wells may be drilled based on a digital seismic image and pore pressure prediction generated in accordance with the disclosure.

The figures, embodiments, and examples provided herein are not necessarily drawn to scale, and instead, the emphasis has been placed upon clearly illustrating the principles of the present disclosure. Moreover, in the figures, like reference numerals designate corresponding parts throughout the several views.

DETAILED DESCRIPTION

Terminology

The following terms will be used throughout the specification and will have the following meanings unless otherwise indicated:

"Formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area). The term formation is not limited to any structure and configuration described herein. The term formation may be used synonymously with the term reservoir.

In some embodiments, the reservoir may include faults, fractures (e.g., naturally occurring fractures, fractures created through hydraulic fracturing, etc.), geobodies, overburdens, underburdens, horizons, salts, salt welds, or any combination thereof. In some embodiments, the reservoir may be a shale reservoir, carbonate reservoir, or any combination thereof. In some embodiments, the reservoir may include hydrocarbons (also known as oil or petroleum), such as liquid hydrocarbons, gas hydrocarbons, or any combination thereof. Examples of hydrocarbons may be conventional oil, natural gas, heavy oil, clathrates (also known as hydrates), or any combination thereof. The hydrocarbon may include non-hydrocarbon items such as connate water, brine, fluids from enhanced oil recovery, etc.

The hydrocarbons may be recovered from the reservoir using primary recovery, secondary recovery, enhanced oil recovery, or any combination thereof. The term "enhanced oil recovery" refers to techniques for increasing the amount of hydrocarbons that may be extracted from a reservoir. Using EOR, 40-60% of the reservoir's original oil can typically be extracted compared with only 20-40% using primary recovery (e.g., by relying on pressure to recover hydrocarbons) and secondary recovery (e.g., by using water injection or natural gas injection to recover hydrocarbons). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), microbial injection, and thermal recovery (which includes, for example, cyclic steam and steam flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

"Wellbore" refers to a single hole for use in hydrocarbon recovery. For example, a wellbore may be a cylindrical hole drilled into the subsurface used to explore for accumulations of hydrocarbons. The wellbore can be used for injection, production, or both. The wellbore may include casing, liner, tubing, heating elements, any combinations thereof, etc. The wellbore may include an openhole portion or uncased portion. The wellbore is surrounded by the formation, rocks, sands, sediments, etc. The wellbore may have vertical, inclined, horizontal, or combination trajectories. The wellbore may include any completion hardware that is not discussed separately. The term wellbore is not limited to any structure and configuration described herein. The term wellbore may be used synonymously with the terms borehole or well.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs.

Improved Pore Pressure Prediction Based on an Integrated Seismic and Basin Modeling Approach—

Various embodiments of generating a pore pressure prediction through integration of seismic data and basin modeling are provided. In one embodiment, a method includes (a) receiving a seismic velocity model; (b) receiving a basin model; (c) extracting at least one convergence parameter from the seismic velocity model; (d) extracting spatial coordinates and seismically derived velocities from the seismic velocity model where the at least one convergence parameter resides within an acceptable threshold corresponding to that convergence parameter; (e) extracting effective stress from the basin model at the spatial coordinates; (f) crossplotting the seismically derived velocities from the seismic velocity model and the effective stress from the basin model at the spatial coordinates; (g) defining seismic transform functions and an uncertainty range from the crossplotting; (h) transforming the seismically derived velocities into calculated effective stress using selected seismic transform functions and calculating pore pressure using an equation transforming the calculated effective stress into calculated pore pressure; (i) identifying a subset of the selected seismic transform functions that closely reproduce well pressure, reside between hydrostatic pressure and lithostatic pressure, or any combination thereof, where the subset is identified in response to the calculated pore pressure being adequate based on a comparison of the calculated pore pressure and validation data, pore pressure derived from the basin model, or any combination thereof; (j) using an inverse of the subset to convert the effective stress from the basin model into basin model derived velocities; (k) building a hybrid velocity model including a plurality of regions by selecting velocities from the basin model derived velocities or from the seismically derived velocities in each region; and (l) generating a digital seismic image using the hybrid velocity model.

Advantageously, the embodiments provided herein use digital image processing to generate the digital seismic image with an improved pore pressure prediction. As such, those of ordinary skill in the art may appreciate that the embodiments provide an innovation in computer technology, namely digital image processing, which reflects both an improvement in the functioning of a computing system, such as computer, and an improvement in another technology, such as hydrocarbon exploration and production technology. Indeed, a high-quality digital seismic image is beneficial for reducing the oil and gas exploration risk and minimizing the number of drilled dry holes, which is especially true as hydrocarbon exploration migrates towards the imaging of sub-salt reservoirs.

Advantageously, those of ordinary skill in the art may appreciate that the embodiments provided herein rely on a seismic data-driven approach for the digital seismic image and the improved pore pressure prediction. For example, the seismic data-driven approach does not require any well data. The seismic data-driven approach only requires limited geologic knowledge of the subsurface, for example, the following are not required: (a) digital images of subsurface sand and shale deposits or (b) digital images of the configuration and geometry of the subsurface. Moreover, the seismic data-driven approach makes no assumption of the subsurface and can be utilized in practically any area (e.g., onshore, offshore—shallow water or deep water, etc.), with few to no wellbores or associated downhole data (e.g., well logs, cores, sensors, etc.). If desired, available well data, etc. may be used, but no well data, etc. is necessary. Advantageously, those of ordinary skill in the art will appreciate that decisions based on the digital seismic image and the improved pore pressure prediction may be made. For example, decisions may be made regarding whether or not to even produce a hydrocarbon deposit. If the desired outcome is to produce the hydrocarbon deposit, those of ordinary skill in the art will appreciate that decisions about where to drill one or more well can be made. Making the decision regarding the well location may include the latitude, longitude, depth, etc. of the well. Furthermore, if the desired outcome is to produce the hydrocarbon deposit, those of ordinary skill in the art will appreciate that decisions about how many wells to drill can be made. If the desired outcome is to avoid the hydrocarbon deposit (such as a hydrate deposit), those of ordinary skill in the art will appreciate that the location of the hydrocarbon deposit can be used to make decisions about where not to drill wells or where to drill wells so as to avoid the hydrocarbon deposit and produce hydrocarbons from a different hydrocarbon deposit. Furthermore, if the desired outcome is to avoid the hydrocarbon deposit, those of ordinary skill in the art will appreciate that decisions about how many wells to drill can be made to avoid the hydrocarbon deposit.

Additionally, those of ordinary skill in the art will appreciate that decisions about which completions, components, fluids, etc. to select for the one or more wellbores to be drilled, including the configuration of the one or more wellbores (e.g., vertical, horizontal, etc.), can also be made based on the digital seismic image and the improved pore pressure prediction. For example, casing, tubing, packers, heaters, sand screens, gravel packs, items for fines migration, etc. may be selected. Moreover, methodologies to produce the hydrocarbon deposit may also be selected. In the context of a hydrate deposit, for example, some methodologies and devices that may be selected are provided in the following patents and patent applications assigned to Chevron U.S.A. Inc.: US Patent App. No. 2015/0090455, U.S. Pat. No. 7,812,203, US Patent App. No. 2008/0102000, U.S. Pat. Nos. 7,964,150, 8,201,626, and 7,537,058, all of which are incorporated herein by reference in their entirety and for all purposes. In short, those of ordinary skill in the art will appreciate that the options are many and making proper decisions based on the digital seismic image and the improved pore pressure prediction should improve the likelihood of safe and reliable operations.

Advantageously, those of ordinary skill in the art will appreciate that the hydrocarbon recovery technique may even be selected based on the digital seismic image and the improved pore pressure prediction. For example, the pore pressure prediction may be used to select a well location with adequate pore pressure for primary recovery. For example, the pore pressure prediction may be used to determine when to change from primary recovery to secondary recovery or enhanced oil recovery.

Advantageously, those of ordinary skill in the art will appreciate that other decisions may also be made based on the digital seismic image and the improved pore pressure prediction. For example, decisions may be made regarding prioritization of hydrocarbon production drilling projects, resource management, etc. to focus efforts on producing hydrocarbon deposits likely to have more favorable pore pressures.

FIG. 1 illustrates a schematic sectional view of one embodiment of a reservoir that is in fluid communication with an injection well and a production well, and the wells may be drilled based on a digital seismic image and pore pressure prediction generated in accordance with the disclosure. In FIG. 1, an injection well 21 is illustrated extending to a portion of a subterranean reservoir 23, which contains hydrocarbons for production. Injection well 21 is in fluid communication with subterranean reservoir 23 and the hydrocarbons therewithin. Production well 25 is positioned a predetermined distance away from injection well 21 and is also in fluid communication with reservoir 23 in order to receive the hydrocarbons therefrom. There can be additional production wells 25 spaced apart from injection well 21 at predetermined locations to optimally receive the hydrocarbons being pushed through reservoir 23 due to injections from injection well 21. Each of the wells may be drilled at well locations that were selected based on the digital seismic image and pore pressure prediction as discussed herein.

In an embodiment, an injection fluid may be injected through injection well 21 into reservoir 23. The injection fluid 27 disperses through reservoir 23, with at least a portion thereof proceeding toward production well 25. Sweep efficiency may be improved as the injection fluid proceed toward production well as flood front 29. While not shown in FIG. 1, the injection fluid can be continuously or intermittently injected through injection well 21 into reservoir 23 in an improved or enhanced oil recovery operation.

Figure 2:
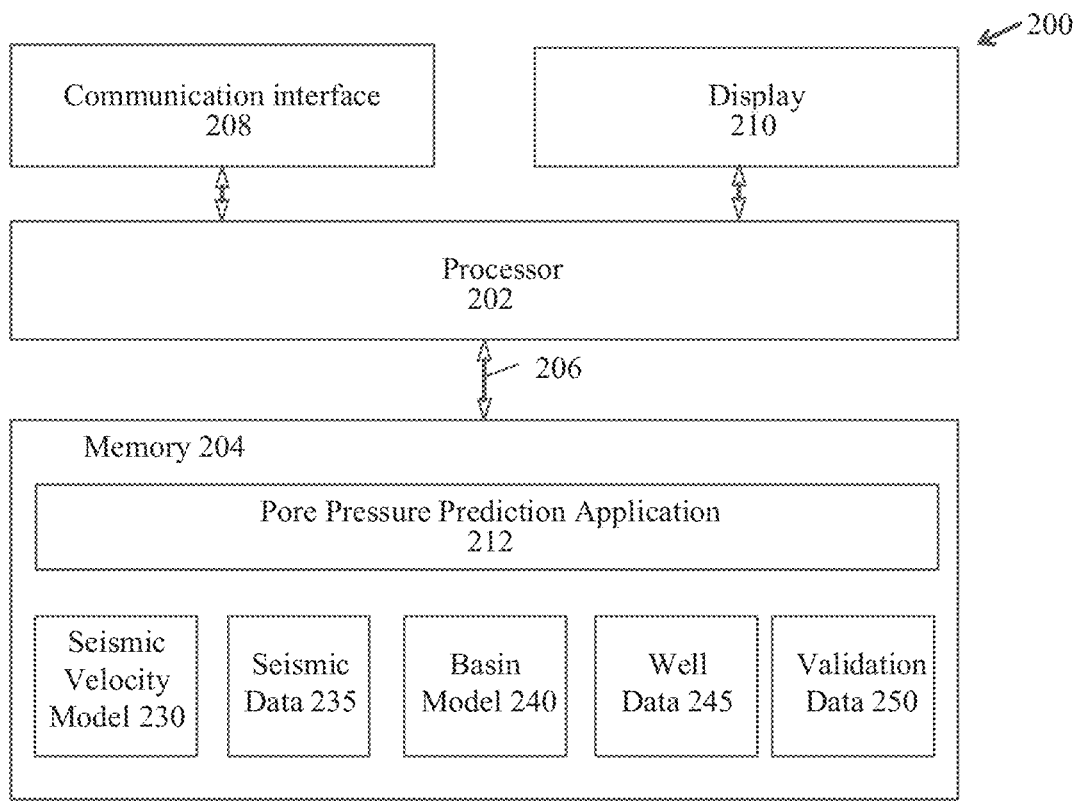
FIG. 2 illustrates one embodiment of a computing system for generating a pore pressure prediction through integration of seismic data and basin modeling in accordance with the disclosure.

Turning to FIG. 2, this figure illustrates one embodiment of a computing system for generating a pore pressure prediction through integration of seismic data and basin modeling in accordance with the disclosure. In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks. The computing system 200 may be a computer, a wireless device, a wired device, a plurality of networked devices, etc.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory stores a pore pressure prediction application 212, discussed in further detail below.

The computing system 200 can also include a communication interface 208 configured to receive data such as a seismic velocity model 230, seismic data 235, a basin model 240, well data 245, validation data 250, or any combination thereof. Other data may be received via the communication interface 208. The communication interface 208 may also be configured to transmit data (e.g., transmit a digital seismic image generated herein, transmit a pore pressure prediction generated herein, etc.), or other functionality.

Additionally, a display 210 can be used for presenting a user interface associated with the pore pressure prediction application 212. In various embodiments, the computing system 200 can include additional components, such as peripheral I/O devices, for example, to allow a user to interact with the user interface associated with the pore pressure prediction 212. For example, the display 210 and the peripheral I/O devices may allow a user to provide user input, view and edit settings, manipulate digital images such as digital seismic images generated herein, manipulate the seismic velocity model 230, the seismic data 235, the basin model 240, the well data 245, the validation data 250, or any combination thereof, or other functionality. In some embodiments, the user may even provide at least a portion of the seismic data 235, at least a portion of the well data 245, etc. via the user interface.

In various embodiments, the computing system 200 may allow for interaction with at least one other software item, at least one other hardware item, or both (e.g., software or hardware items from third parties: Paradigm Limited, Schlumberger Limited, Landmark business line from Halliburton Company, Compagnie Generale de Geophysique-Veritas, dGB Earth Sciences B.V., Foster Findlay Associates Limited, etc.) to carry out one or more claim elements or other functionality.

In some embodiments, the pore pressure prediction application 212 may include a plurality of components to separate functionality. For example, the pore pressure prediction application 212 may have a separate seismic velocity model component to build or modify the seismic velocity model 230. For example, the pore pressure prediction application 212 may have a separate basin model component to build or modify the basin model 240. For example, the pore pressure prediction application 212 may have a separate pore pressure component to calculate and compare the calculated pore pressure. For example, the pore pressure prediction application 212 may have a separate seismic digital seismic image component to generate digital seismic images. One or more components may present at least one user interface to the user in order for the user to provide user input. In some embodiments, some components may be combined into a single component, or alternatively, the pore pressure prediction application 212 may not have any components. Furthermore, in some embodiments, the pore pressure prediction application 212 may interact with software, hardware, or both from a third party, such as interact with at least one application from a third party. In short, those of ordinary skill in the art will appreciate that various modifications may be made and the scope of the claims is not limited to the discussion herein. For example, those of ordinary skill in the art will appreciate that the inventive principles may be implemented using automated steps only or using a combination of automated steps and manual steps.

Indeed, embodiments of the present disclosure can be implemented as a computer process (method), a process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 200, above. Computer storage media does not include a carrier wave or other propagated or modulated data signal. In some embodiments, the computer storage media includes at least some tangible features; in many embodiments, the computer storage media includes entirely non-transitory components.

Figure 3:
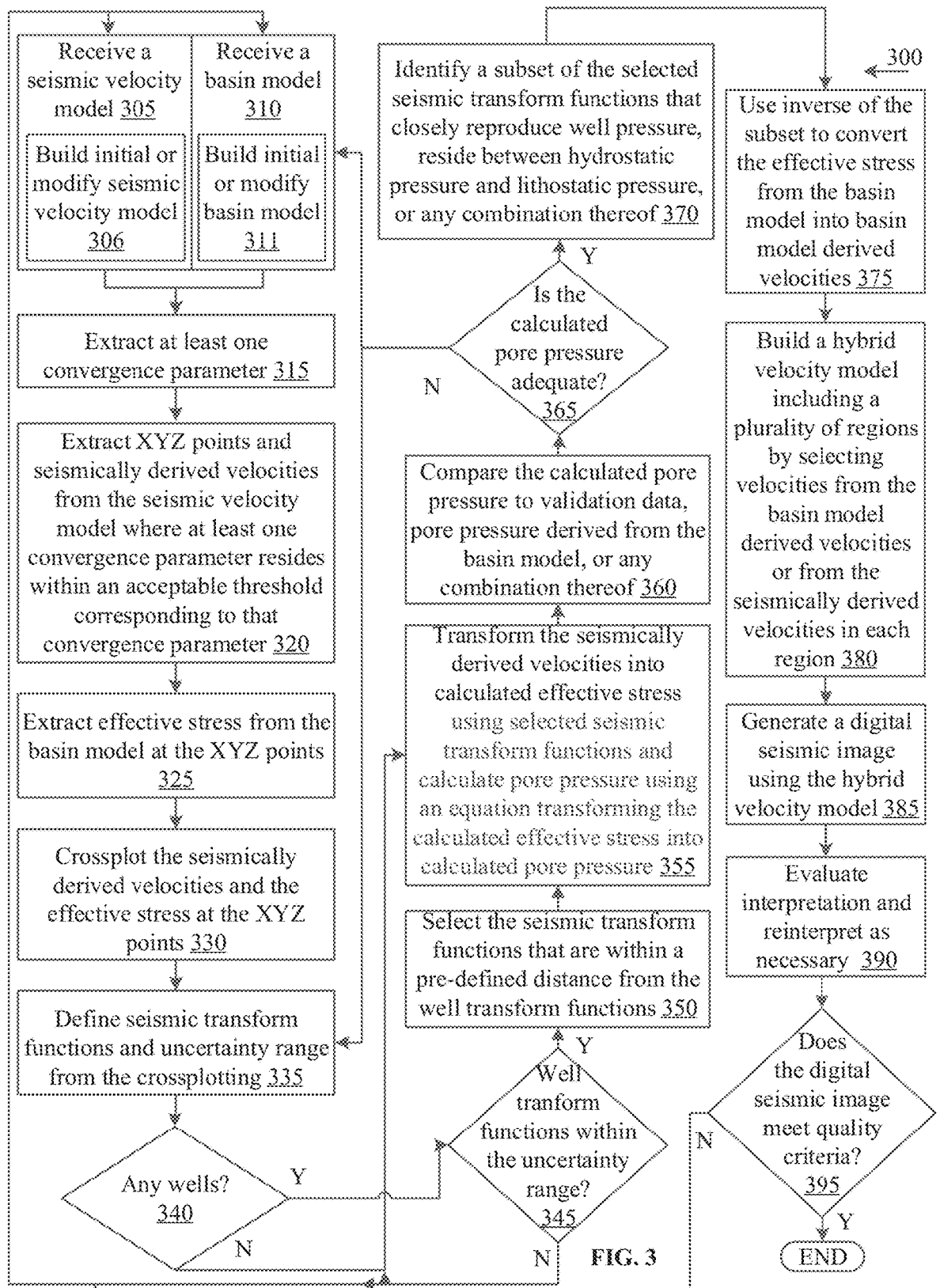
FIG. 3 illustrates one embodiment of a method for generating a pore pressure prediction through integration of seismic data and basin modeling in accordance with the disclosure.

Turning to FIG. 3, this figure illustrates one embodiment of a method for generating a pore pressure prediction through integration of seismic data and basin modeling, referred to as a method 300, in accordance with the disclosure. The method 300 may be executed by the computing system 200 of FIG. 2. In some embodiments, at least one portion of the method 300 may be performed in an iterative manner. In some embodiments, the entirety of the method 300 may be performed in an iterative manner. Those of ordinary skill in the art will appreciate that various modifications may be made to the method 300 and the scope of the claims is not limited to the discussion herein. For example, those of ordinary skill in the art will appreciate that the inventive principles may be implemented using automated steps only or using a combination of automated steps and manual steps.

At 305, the method 300 includes receiving a seismic velocity model. In some embodiments, receiving the seismic velocity model may include building an initial seismic velocity model or modifying an existing seismic velocity model, such as modifying the initial seismic velocity model, at 306. An existing seismic velocity model may be modified in response to a "no" decision at 395 when the method 300 is executed in an iterative manner.

A seismic velocity model 230 is illustrated in FIG. 2 to represent the seismic velocity model that may be received at 305. The seismic velocity model 230 may be built or modified by the computing system 200 and used by the computing system 200. Alternatively, an external source may build or modify the seismic velocity model 230, and the computing system 200 may receive the seismic velocity model 230 from the external source. The external source may be a database or storage medium, a networked computing system, one or more vendors specializing in generating seismic velocity models, etc. Alternatively, the seismic velocity model 230 may be built by an external source and the seismic velocity model 230 may be modified by the computing system 200, or vice versa, in some embodiments. Those of ordinary skill in the art will appreciate that various options for building or modifying the seismic velocity model 230 may be available.

The seismic velocity model 230 may be built or modified from common image point gathers using seismic tomography, full waveform inversion, high resolution move-out analysis, or any combination thereof. Indeed, practically any appropriate method known to those of ordinary skill in the art may be utilized to build or modify the seismic velocity model 230. Moreover, the seismic velocity model 230 may be built or modified from seismic data. An example of the seismic data may be seismic data 235 illustrated in FIG. 2. The seismic data 235 may be generated by sending sound waves through the Earth via at least one source (e.g., airgun, vibroseis, etc.) and recording the arrival of the sound waves with at least one receiver (e.g., hydrophone, geophone, etc.). The seismic data 235 may include at least one 2D digital image of the subsurface of interest in some embodiments. The seismic data 235 may include at least one 3D digital image of the subsurface of interest in some embodiments. The seismic data 235 may include at least one 2D digital image of the subsurface of interest and at least one 3D digital image of the subsurface of interest in some embodiments.

Figure 4:
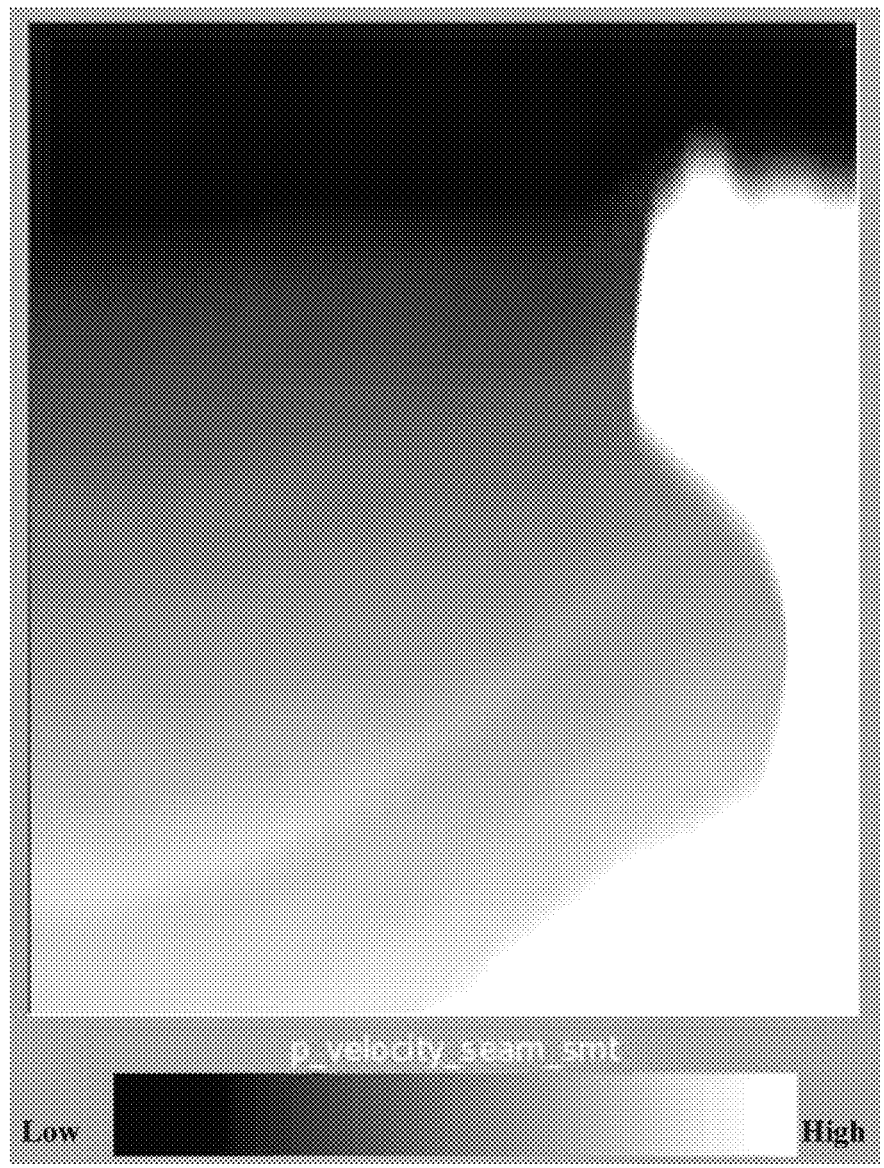
FIG. 4 illustrates one embodiment of a seismic velocity model in accordance with the disclosure.

A user may provide the coordinates in latitude and longitude or otherwise select the subsurface of interest, for example, using I/O devices of the computing system 200, and the computing system 200 may receive the seismic data 235 corresponding to that subsurface of interest. For example, the seismic data 235 may be received from an external source, such as a database or storage medium, a networked computing system, one or more vendors specializing in generating seismic data, etc. FIG. 4 illustrates one embodiment of a seismic velocity model in accordance with the disclosure. FIGS. 4-8 and 12 are based on the synthetic SEAM model. More information on the SEAM model is available in Fehler, M., and K. Lamer, 2008, SEG Advanced Modeling (SEAM): Phase I first year update: The Leading Edge, 27, 1006-1007, which is incorporated herein by reference.

At 310, the method 300 includes receiving a basin model. The term "basin model" may include practically any model addressing pore pressure evolution in a basin through geologic time. The basin model includes dynamic information absent from the seismic data. In some embodiments, receiving the basin model may include building an initial basin model or modifying an existing basin model, such as modifying the initial basin model, at 311. An existing basin model may be modified in response to a "no" decision at 365 or 395 when the method 300 is executed in an iterative manner.

A basin model 240 is illustrated in FIG. 2 to represent the basin model that may be received at 310. For example, the basin model may be built using the interpretation result and other available data, including lab tests, petrophysical properties, and/or mechanical earth models. A few representative basin modeling tools include BasinMod™ from Platte River Associates, Inc., USA; Temis Suite™ from Beicip-Franlab, France; PetroMod from IES™ (Schlumberger), and Permedia™ (Halliburton), each of which is incorporated into the present application by reference.

The basin model 240 may be built or modified by the computing system 200 and used by the computing system 200. Alternatively, an external source may build or modify the basin model 240, and the computing system 200 may receive the basin model 240 from the external source. The external source may be a database or storage medium, a networked computing system, one or more vendors specializing in generating seismic velocity models, etc. Alternatively, the basin model 240 may be built by an external source and the basin model 240 may be modified by the computing system 200, or vice versa, in some embodiments. Those of ordinary skill in the art will appreciate that various options for building or modifying the basin model 240 may be available.

The basin model 240 may be built or modified from geologic data, seismic data (e.g., the seismic data 235), well data, or any combination thereof. Well data may include practically any data associated with a well or wells, and it is illustrated as well data 245 in FIG. 2. "Well data" refers to practically any well data that may be obtained. Well data may include direct measurements by one or more sensors in a wellbore, which measure gamma ray, electrical, acoustic, electromagnetic, nuclear magnetic resonance, pressure, and/or other properties of the subsurface. Well data may include practically any data that is downhole (e.g., well logs, cores, data from sensors, etc.). The well data 245 may be received from an external source, such as a database or storage medium, a networked computing system, one or more vendors specializing in generating well data, etc.

Practically any appropriate method known to those of ordinary skill in the art may be utilized to build or modify the basin model 240. In one embodiment, the basin model 240 may be built or modified using any available data, such as, but not limited to, temperature, measured and/or petrophysics derived pore pressure, lithostatic stress, lithologies, facies from wells and seismic, horizons, rock and fluid properties, appropriate logs, effective stress from mechanical earth models, etc.

Optionally, the basin model 240 may be validated using well data (e.g., the well data 245), validation data, or any combination thereof. Validation data may include practically any data that may be utilized to validate an item, such as the basin model 240, and it is illustrated as validation data 250 in FIG. 2. Representative validation data includes well data, pseudo-well data, seismic data, hydrocarbon shows, etc. The well data 245 may be received from an external source, such as a database or storage medium, a networked computing system, one or more vendors specializing in generating validation data, etc. The basin model 240 may be validated in a single step or in a plurality of steps (e.g., two steps as illustrated in method 1400 in FIG. 14) using data such as, but not limited to, lithostatic pressure from petrophysics, measured and/or predicted pressure from petrophysics, lithostatic load, etc. If the difference between the basin model 240 and the validation data 250 satisfies a predefined threshold level or fit criterion (which typically ranges from 1% to 5%), the basin model 240 is deemed to be sufficiently accurate.

Figure 5:
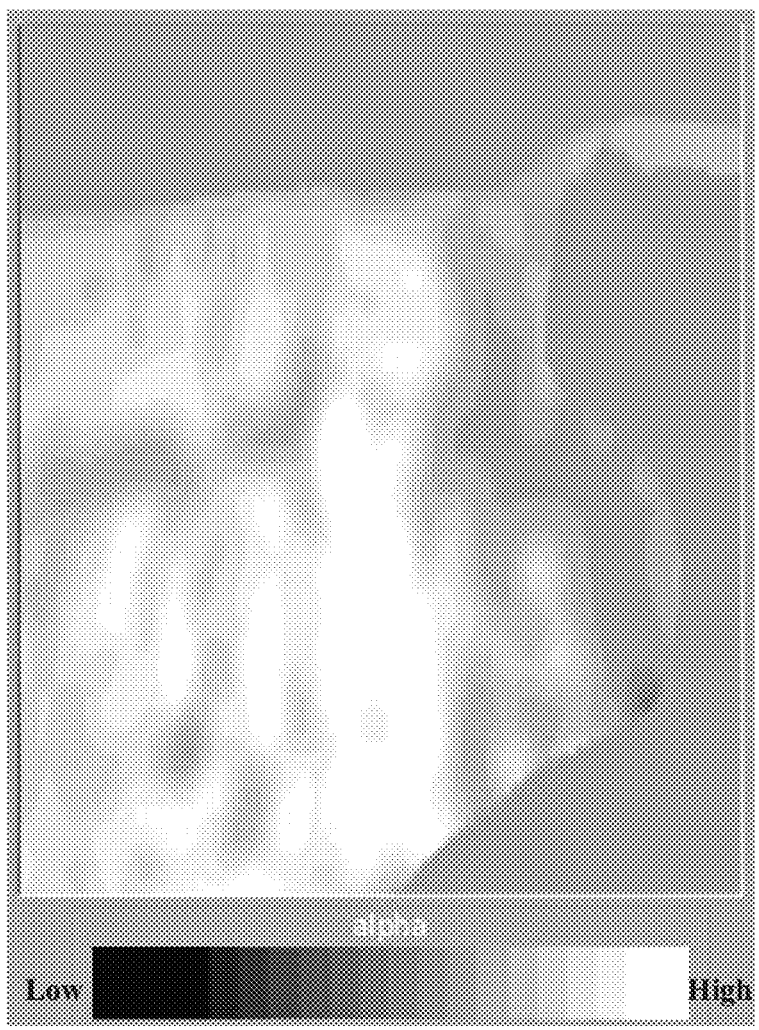
FIG. 5 illustrates one embodiment of residual move-out alpha in accordance with the disclosure.
Figure 6:
FIG. 6 illustrates one embodiment of semblance quality measure sigma in accordance with the disclosure.

At 315, the method 300 includes extracting at least one convergence parameter from the seismic data and velocity model. For example, the method 300 includes extracting at least one convergence parameter from the seismic velocity model 230 and the seismic data 235. Examples of convergence parameters include gather flatness (alpha or $\alpha$), a signal coherence measure such as semblance (sigma or $\sigma$), or any combination thereof. Gather flatness may be extracted from seismic gathers. Signal coherence may be extracted from seismic gathers as well. Those of ordinary skill in the art will appreciate that another convergence parameter may be extracted in some embodiments. FIG. 5 illustrates one embodiment of residual move-out alpha in accordance with the disclosure. FIG. 6 illustrates one embodiment of semblance quality measure sigma in accordance with the disclosure.

Figure 7:
FIG. 7 illustrates one embodiment of XYZ points for seismically derived velocities and vertical effective stress (VES) extraction in mini-basins with acceptable gather flatness (alpha) and signal coherence (sigma) in accordance with the disclosure.

At 320, the method 300 includes extracting spatial coordinates and seismically derived velocities from the seismic velocity model where at least one convergence parameter resides within an acceptable threshold corresponding to that convergence parameter. For example, the method 300 includes extracting spatial coordinates (such as XYZ points representing the X axis, the Y axis, and the Z axis) and seismically derived velocities from the seismic velocity model 230 where at least one convergence parameter from 315 resides within an acceptable threshold corresponding to that convergence parameter. Each convergence parameter may have a corresponding acceptable threshold. The acceptable threshold for a convergence parameter may be user defined, data dependent, seismic velocity model dependent, or any combination thereof. For example, the acceptable threshold of signal coherence (sigma) may be 0.6 or more in some embodiments. The acceptable threshold of signal coherence (sigma) may be 0.8 or more in some embodiments. The acceptable threshold of gather flatness (alpha) may be 0.01 or less in some embodiments. An acceptable threshold for a convergence parameter may be a range in some embodiments. FIG. 7 illustrates one embodiment of XYZ points for seismically derived velocities and vertical effective stress extraction in mini-basins with acceptable gather flatness (alpha) and signal coherence (sigma) in accordance with the disclosure.

Figure 8:
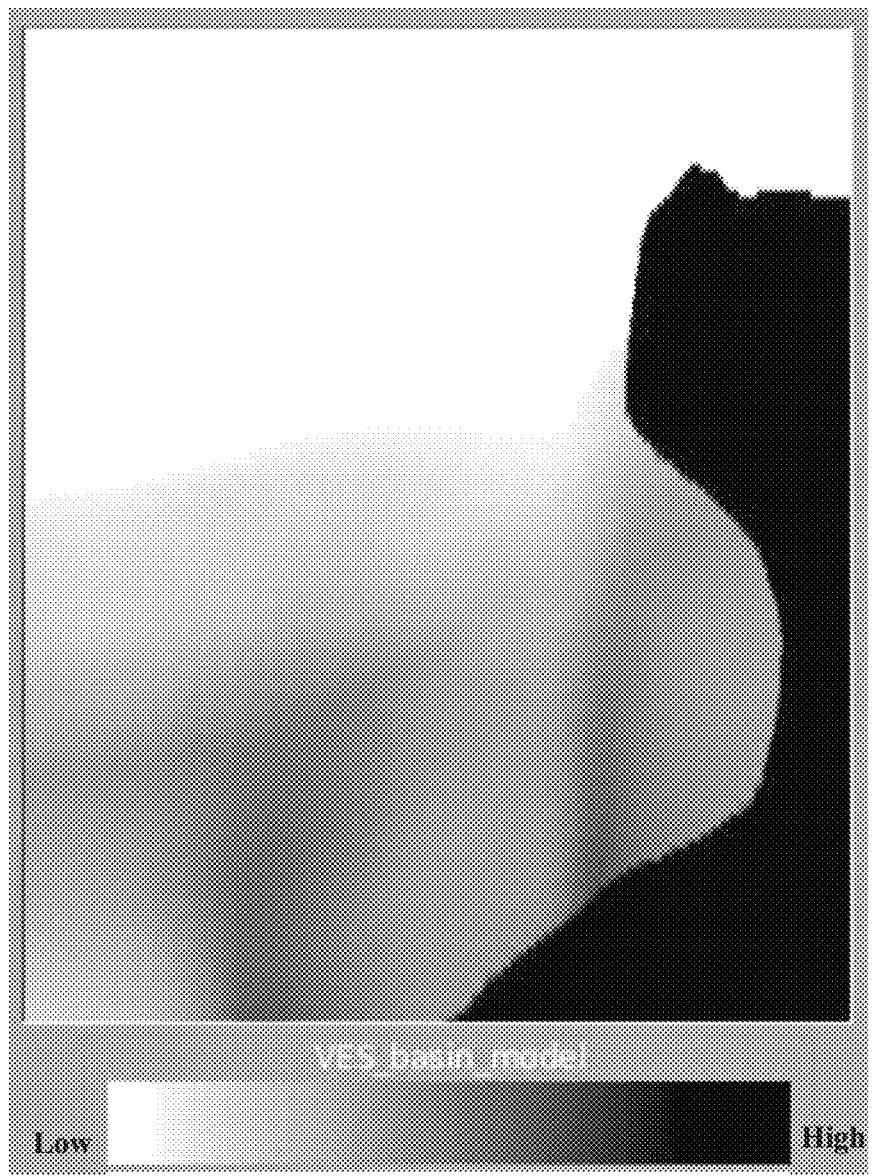
FIG. 8 illustrates one embodiment of vertical effective stress from a basin model in accordance with the disclosure.

At 325, the method 300 includes extracting effective stress from the basin model at the spatial coordinates. For example, the method 300 includes extracting effective stress from the basin model from 240 at the spatial coordinates from 320. The effective stress may be vertical effective stress, horizontal effective stress, any other stress component, mean effective stress, or any combination thereof. At the locations identified as being of highest seismic quality (e.g., $\alpha < \pm 0.01$, $\sigma > 0.6$) from 320, the effective stress is extracted from the basin model from 311. FIG. 8 illustrates one embodiment of vertical effective stress from a basin model in accordance with the disclosure.

Figure 9A:
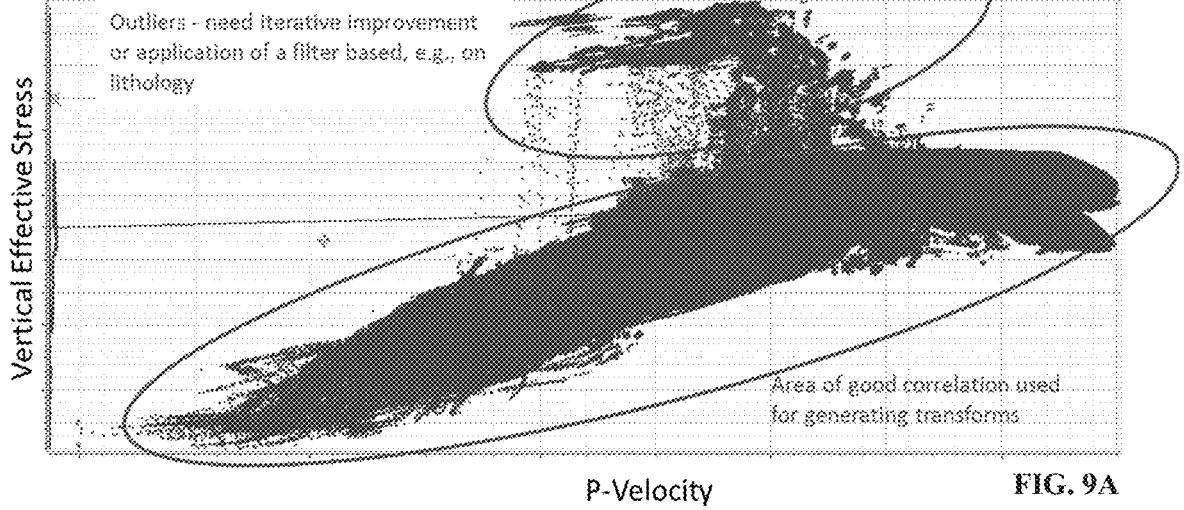
FIG. 9A illustrates one embodiment of a crossplot of seismically derived velocities and effective stress at XYZ points in accordance with the disclosure.

At 330, the method 300 includes crossplotting the seismically derived velocities and the effective stress at the spatial coordinates. For example, the method 300 includes crossplotting the seismically derived velocities from 330 and the effective stress from 325 at the spatial coordinates from 320. The seismically derived velocities and the effective stress may be crossplot for the entire subsurface of interest or separately for different parts of the system (e.g., mini-basin, sub-salt, etc.). FIG. 9A illustrates one embodiment of a crossplot of seismically derived velocities and effective stress at XYZ points in accordance with the disclosure. As illustrated in FIG. 9A, vertical effective stress and seismically derived velocities were extracted from best seismic data areas. Typical causes for the outliers are: poor quality basin or velocity models in some locations, data used comes from different systems, e.g., main trend from a mini-basin and outliers from sub-salt. This could indicate problems with the salt model.

Figure 9B:
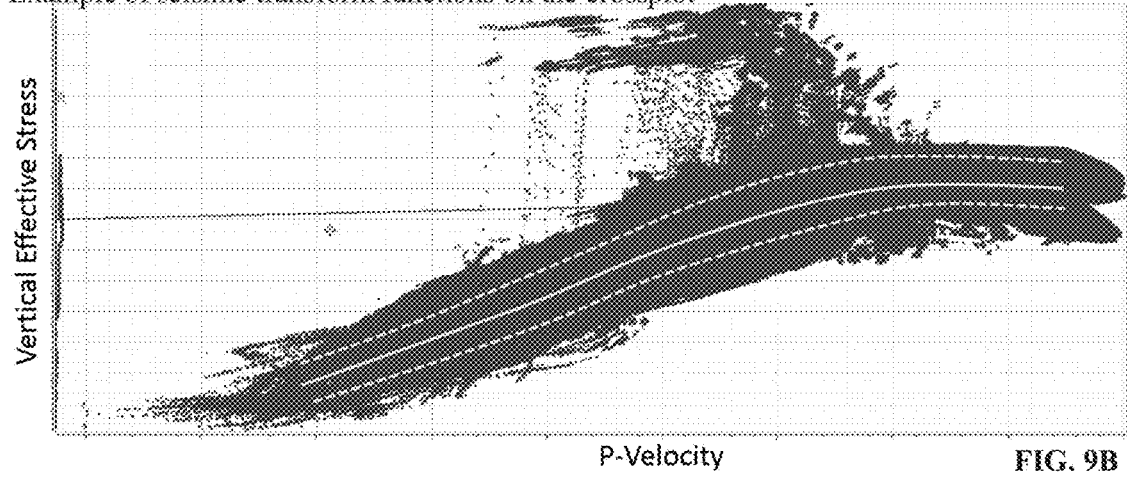
FIG. 9B illustrates an example of seismic transform functions on the crossplot of FIG. 9A in accordance with the disclosure.

At 335, the method 300 includes defining seismic transform functions and an uncertainty range from the crossplotting. For example, the method 300 includes defining seismic transform functions from the crossplotting from 330 and capturing the uncertainty range. By defining the seismic transform functions, for example, from minimum to maximum, the uncertainty range associated with the seismic transform functions is represented. In some embodiments, the seismic transform functions may comprise regression functions. In some embodiments, the seismic transform functions may be minimum, average, maximum, exponential, polynomial, or any combination thereof. The seismic transform functions are defined from the crossplot of seismically derived velocities vs. effective stress providing, for example, mean, upper, and lower bounds to the seismic transform functions. The uncertainty range corresponds to the upper and lower bounds. Those of ordinary skill in the art will appreciate that seismic transform functions are not limited to those disclosed herein. FIG. 9B illustrates an example of seismic transform functions on the crossplot of FIG. 9A in accordance with the disclosure. In FIG. 9B, the area of good correlation was used for the seismic transform functions, and the seismic transform functions include the minimum (dashed line), the maximum (dashed line), and the average (solid line) regression functions. The uncertainty range is bounded by the dashed lines in FIG. 9B.

Of note, crossplots showing lots of scatter may indicate poor correlation between the seismic velocity model and the basin model (problem with one or both), mixing data representing different rocks, basin age, etc. In such a scenario, it is advisable to filter the data, e.g. by mini-basin, sub-salt areas, etc., before an attempt to define seismic transform functions is made.

Figure 9C:
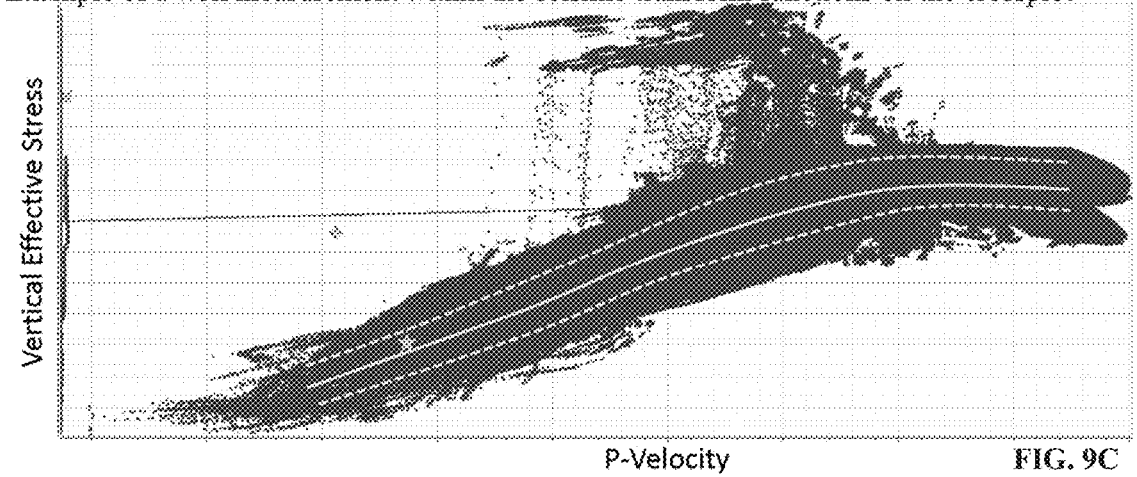
FIG. 9C illustrates one embodiment of a well measurement within the seismic transform functions on the crossplot of FIG. 9B in accordance with the disclosure.
Figure 10:
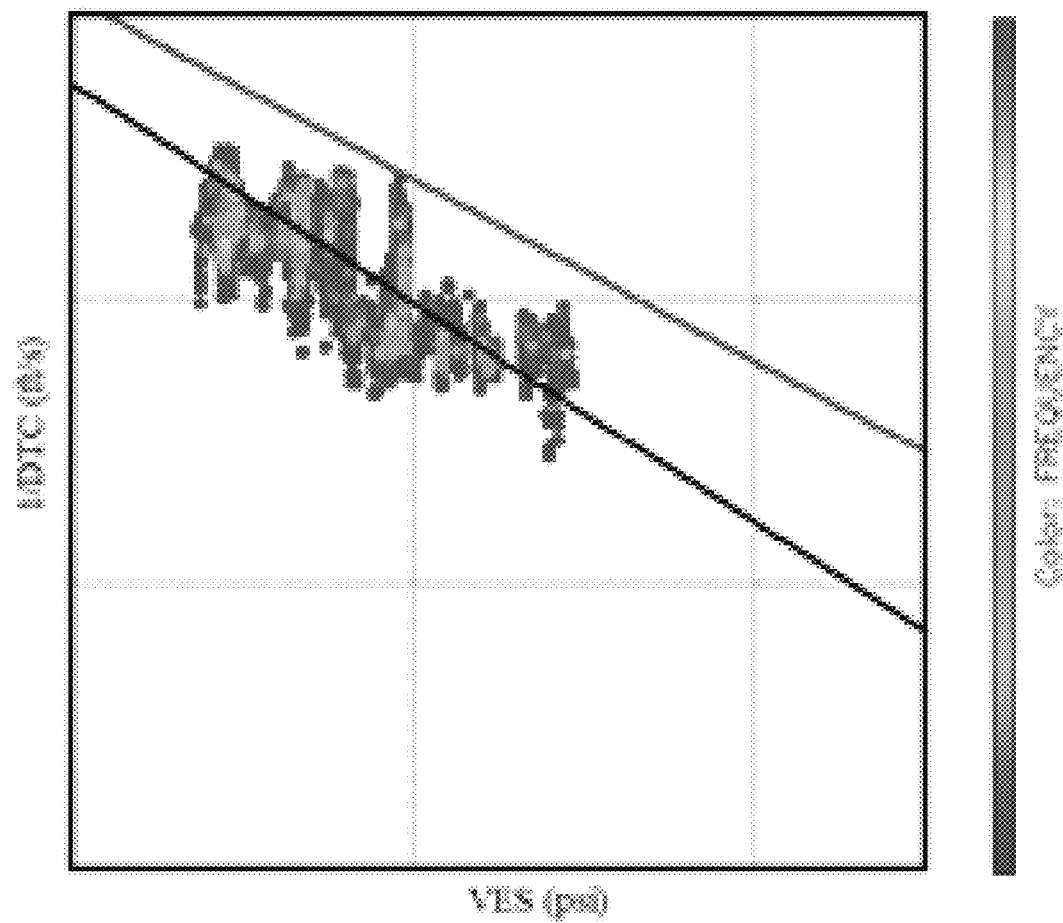
FIG. 10 illustrates one embodiment of well transform functions in accordance with the disclosure.

At 340, the method 300 includes determining if there are any wells available. Those of ordinary skill in the art may appreciate that data about any wells located in the uncertainty range may be more useful, and as such, the method 345 includes determining if there are any well transform functions within the uncertainty range. For example, the method 300 includes determining if there are any well transform functions within the uncertainty range from 335. Wells may or may not be located at the spatial coordinates from 330. In some embodiments, the well transform functions comprise second regression functions independently derived from at least one well. In some embodiments, the well transform functions may be derived from sonic data, pressure data (e.g., pressure data that is measured or derived from well logs), borehole seismic data, or any combination thereof. Those of ordinary skill in the art will appreciate that the well transform functions are not limited to those disclosed herein. FIG. 9C illustrates one embodiment of a well measurement corresponding to a well located within the seismic transform functions on the crossplot of FIG. 9B in accordance with the disclosure. FIG. 10 illustrates one embodiment of well transform functions in accordance with the disclosure.

If at least one well transform function is within the uncertain range, control may pass to 350. At 350, the method 300 includes selecting the seismic transform functions that are within a pre-defined distance from the well transform functions. For example, the method 300 includes selecting seismic transform functions from 335 that are within the pre-defined distance from the well transform functions from 345. Transform functions derived at well locations (TFW) from well velocity and pressure data (from 345) and seismically derived transform functions (TFS) should meet certain pre-defined criteria (from 335), e.g., ∥TFW-TFS∥<ε. If both functions reside within the minimum and maximum (envelope) of the seismically derived transform functions from 335, then the pre-defined distance may be met.

At 355, the method 300 includes transforming the seismically derived velocities into calculated effective stress using selected seismic transform functions and calculating pore pressure using an equation transforming the calculated effective stress into calculated pore pressure. For example, the method 300 includes transforming the seismically derived velocities from 330 into calculated effective stress using selected seismic transform functions from 350 and calculate pore pressure using an equation transforming the calculated effective stress from 355 into calculated pore pressure.

Of note, if the decision is "no" at 340 or at 345, control may also pass to 355, and the defined seismic transform functions from 335 may be utilized as the selected seismic transform functions at 355. Also of note, if the decision is "no" at 345, in some embodiments, control may pass to 305, 306, 310, 311, or any combination thereof to revisit the seismic velocity model, the basin model, or both. For example, control may pass from 345 to 305, 306, 310, 311, or any combination thereof, instead of 355, because there are wells per 340 but the well transform functions are not within the uncertainty range. Those of ordinary skill in the art will appreciate that well transform functions in the uncertainty range may increase the likelihood of accuracy, and therefore, it may be worth revisiting the seismic velocity model, the basin model, or both in order to have well transform functions in the uncertainty range. If the well transform function are still not within the uncertainty range at 345 after revisiting the seismic velocity model, the basin model, or both, as well as passing through 315-340, control may pass from 345 to 355 to bypass the well related information.

Returning to 355, the effective stress (ES) may be calculated with ES=f(seismically derived velocities). The pore pressure (PP) may be calculated with the following equation: PP=lithostatic pressure−ES. In some embodiments, a plurality of equations may be utilized. Other equations known to those of ordinary skill in the art may also be utilized to calculate pore pressure. The calculated effective stress and the calculated pore pressure may represent these values for the entire subsurface of interest.

At 360, the method 300 includes comparing the calculated pore pressure to validation data, pore pressure derived from the basin model, or any combination thereof. For example, the method 300 includes comparing the calculated pore pressure from 355 to validation data 250, pore pressure derived from the basin model 240, or any combination thereof. The comparison is utilized to identify a subset of the selected seismic transform functions from 355 that closely reproduce well pressure, reside between hydrostatic pressure and lithostatic pressure, or any combination thereof.

Figure 11:
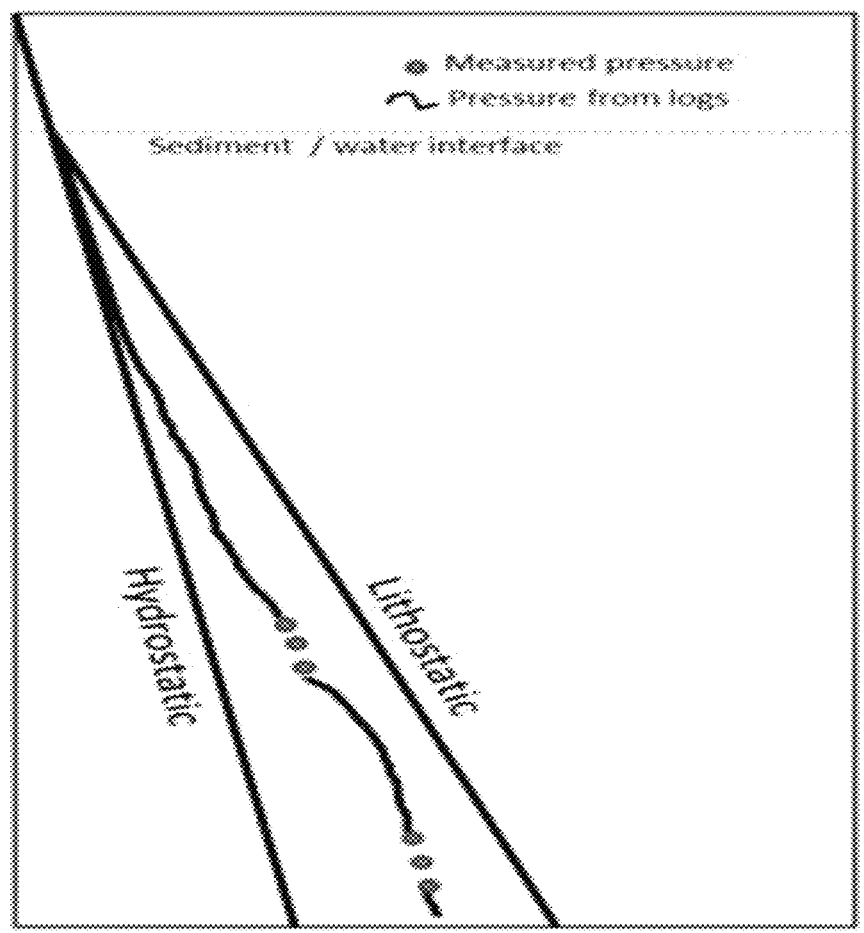
FIG. 11 illustrates one embodiment of a pressure profile with depth in accordance with the disclosure.

As previously discussed herein, representative validation data includes well data, pseudo-well data, seismic data, hydrocarbon shows, or any combination thereof. The validation data used at 360 may relate to wells that are the same or different than the wells at 340, 345. If no well is available at 360, then the calculated pore pressure may be compared to a pore pressure derived from the basin model, which assumes that the basin model is reliable. The calculated pore pressure should reside between hydrostatic pressure and lithostatic pressure. FIG. 11 illustrates one embodiment of a pressure profile with depth in accordance with the disclosure.

At 365, the method 300 determines whether the calculated pore pressure is adequate. For example, the method 300 determines whether the calculated pore pressure from 355 is adequate based on the comparison from 360. If the calculated pore pressure is not adequate, then the reason for the inadequate calculated pore pressure should be explored. For example, the reason may be the basin model 240, or the seismic transform functions and the uncertainty range from the crossplotting from 335, or both. In some embodiments, it may be more efficient for control to pass to 335 to define new seismic transform functions and a new uncertainty range. If the new calculated pore pressure is still inadequate at 365 based on the new seismic transform functions and the new uncertainty range, then control may pass to 310 to start over with a new basin model. Those of ordinary skill in the art will appreciate that this portion of the method 300 may be executed in an iterative manner until the calculated pore pressure is adequate at 365. The improved pore pressure prediction of the method 300 will be the result of 365.

The calculated pore pressure may be adequate when the calculated pore pressure is consistent with the validation data, when the calculated pore pressure is consistent with the pore pressure derived from the basin model, or any combination thereof. The calculated pore pressure may be consistent when the difference satisfies a threshold, such as a threshold of +−1% or a threshold of +−2%. In some embodiments, the calculated pore pressure is adequate when the difference between the calculated pore pressure and the pore pressure derived from the basin model is within +−1%. In some embodiments, the calculated pore pressure is adequate when the difference between the calculated pore pressure and the pore pressure derived from the basin model is within +−2%. Similarly, the calculated pore pressure is adequate when the difference between the calculated pore pressure and the validation data is within the threshold.

In response to the calculated pore pressure being adequate based on the comparison of 360-365, then at 370, the method 300 includes identifying a subset of the selected seismic transform functions that closely reproduce well pressure, reside between hydrostatic pressure and lithostatic pressure, or any combination thereof. For example, the method 300 includes identifying a subset of the selected seismic transform functions from 355 that (e.g., together with the equation transforming the calculated effective stress into calculated pore pressure) closely reproduce well pressure from 345, 360, reside between hydrostatic pressure and lithostatic pressure, or any combination thereof. FIG. 11 illustrates one embodiment of a pressure profile with depth, with hydrostatic pressure and lithostatic pressure, in accordance with the disclosure. Again, if the decision is "no" at 340 or at 345, control may also pass to 355, and the seismic transform functions from 335 may be utilized as the selected seismic transform functions at 355.

Putting it together, quality control and determination of satisfactory seismic transform functions are performed at 345-370. Two measures are used to confirm that seismic transform functions are satisfactory: (a) Transform functions derived at well locations (TFW) from well velocity and pressure data (from 345) and seismic transform functions (TFS) should meet certain pre-defined criteria (from 350), e.g., $\|TFW-TFS\|<\varepsilon$; (b) Using the selected seismic transform functions (from 350), seismically derived velocities are translated to pore pressure (at 355) and compared to pressure data at well locations (at 360). A subset of selected seismic transform functions is identified that closely reproduces measured pore pressure and/or pore pressure derived from logs (at 370).

Furthermore, the identified subset of the selected seismic transform functions from 370 may be utilized for analyzing a different subsurface area of interest. For example, the different subsurface area of interest may not have a basin model associated with it. For example, the different subsurface area of interest may not have validation data associated with it, and so on. Thus, the identified subset of the selected seismic transform functions from 370 may be utilized for analyzing this different subsurface area of interest, and for example, generating a seismic image for this different subsurface area of interest.

Figure 12:
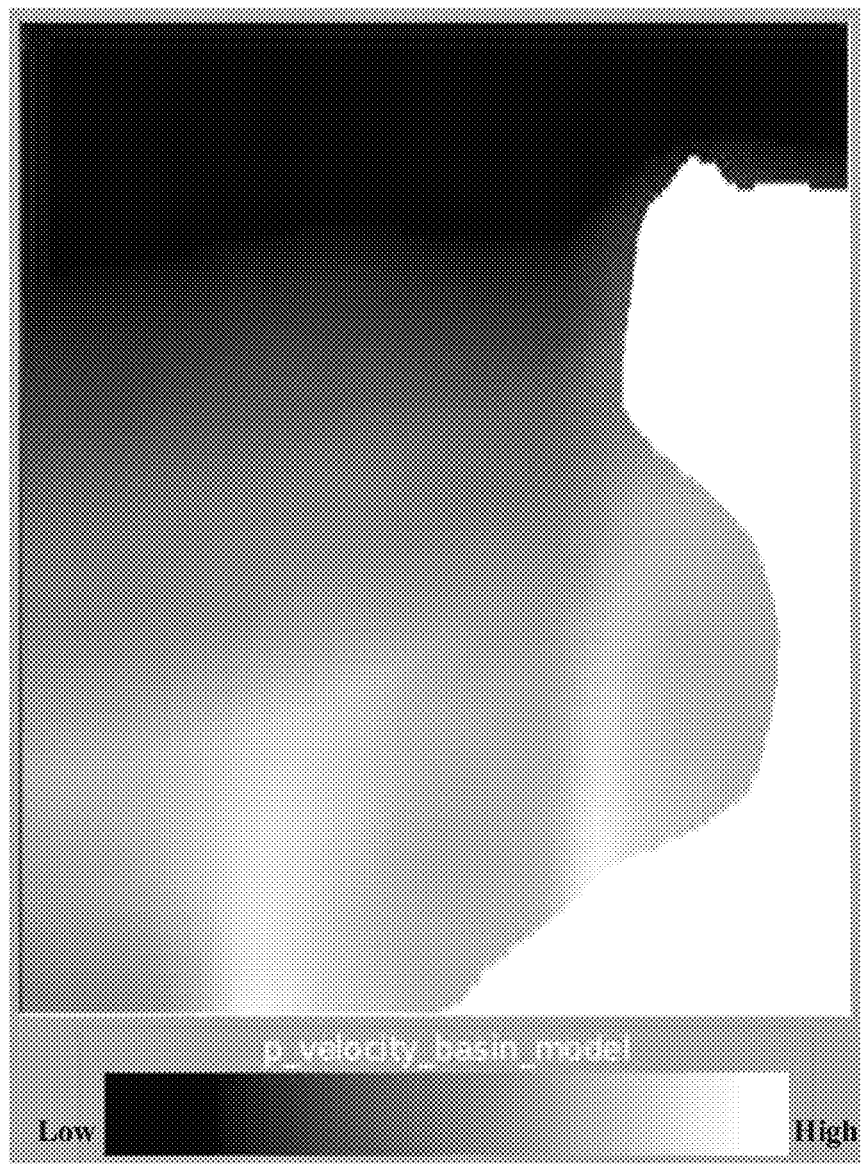
FIG. 12 illustrates one embodiment of basin model derived velocities in accordance with the disclosure.

At 375, the method 300 includes using the inverse of the subset to convert the effective stress from the basin model into basin model derived velocities. For example, the method 300 includes using the inverse of the subset from 370 to convert the effective stress from the basin model from 310 into basin model derived velocities. Of note, the effective stress conversion at 375 is not limited to that found at the spatial coordinates of 325. FIG. 12 illustrates one embodiment of basin model derived velocities in accordance with the disclosure.

At 380, the method 300 includes building a hybrid velocity model including a plurality of regions by selecting velocities from the basin model derived velocities or from the seismically derived velocities in each region. For example, the method 300 includes building a hybrid velocity model including a plurality of regions by selecting velocities from the basin model derived velocities from 375 or from the seismically derived velocities from 305 in each region. Of note, the seismically derived velocities at 380 are not limited to those found at the spatial coordinates of 320. In building the hybrid velocity model, poor quality areas of seismically derived velocities are replaced with basin model derived velocities. As a result, the hybrid velocity model includes seismically derived velocities in good seismic quality areas and basin model derived velocities in poor quality areas.

At 385, the method 300 includes generating a seismic image using the hybrid velocity model. For example, the method 300 includes generating a seismic image using the hybrid velocity model from 380. Generating the seismic image may include using depth migration, time migration, etc.

At 390, the method 300 includes evaluating interpretation and reinterpreting as necessary. For example, the method 300 includes evaluating interpretation, such as comparing the interpretation to the seismic image from 385, and reinterpreting as necessary. A user may perform the evaluation and the reinterpretation. For example, the user may determine if the seismic image is consistent with the interpretation, if the seismic image includes anything new as compared to the interpretation, if the seismic image includes anything incorrect as compared to the interpretation, if the seismic image has a missing item as compared to the interpretation, etc. The user may also compare the seismic image to quality criteria, which is discussed further in the context of 395.

At 395, the method 300 includes determining whether the digital seismic image meets quality criteria. For example, the method 300 includes determining whether the digital seismic image from 385 meets quality criteria. The quality criteria may be continuity of reflectors, focus of amplitudes, gather flatness, fit to validation data from wells, or any combination thereof. For example, iteration application of workflow should happen in the subsurface of interest when the continuity of reflectors is not equal or not improving between seismic images, gather flatness is not equal or not improving between seismic images, etc. The digital seismic image may be compared to the quality criteria in a completely automated manner, in a completely manual manner, or both a combination of automated and manual. In some embodiments, one or more thresholds may even be utilized to determine if an item is not equal or not improving between seismic images. Of note, during the first iteration, the seismic image from 385 may be compared to a preliminary seismic image. If the digital seismic image does meet the quality criteria during this first iteration, then the method 300 may end. Even with one iteration, the digital seismic image at the end of the method 300 may provide a more accurate pore pressure prediction (at 365) and the digital seismic image may be utilized to make at least one decision, such as selecting a well location, designing the well to be drilled at that well location, drilling the well at that well location, and producing hydrocarbons via the well.

If the digital seismic image does not meet the quality criteria, then the method 300 may begin again (i.e., second iteration) with receiving a seismic velocity model at 305 (such as by modifying the previous seismic velocity model from the previous iteration), receiving a basin model at 310 (such as by modifying the previous basin model from the previous iteration), or both. The digital seismic image generated during the second iteration may be compared to the digital seismic image generated during the first iteration at 395, and the method 300 may begin again as necessary, until an adequate digital seismic image is generated. By iterating, the digital seismic image may continue to improve and provide a more accurate pore pressure prediction (at 365). The final improved digital seismic image may be utilized to make at least one decision, such as selecting a well location, designing the well to be drilled at that well location, drilling the well at that well location, and producing hydrocarbons via the well.

The resultant digital seismic image is dependent on the accuracy of the models used by seismic imaging. The more complex the geological structure of an area is, the more important the accuracy of the seismic velocity model, for example, is for producing an accurate digital seismic image. Conversely, the resultant digital seismic image is also useful for improving the seismic velocity model. For example, from analyzing the digital seismic image, an interpreter/user can identify major geological structures in the image and determine how well the seismic events are focused in the image. Such interpretation result may then lead to an improved seismic velocity model, which is then used for producing a more accurate digital seismic image. Therefore, portions of the method 300 may iterate through multiple rounds until desired results are achieved.

Figure 13A:
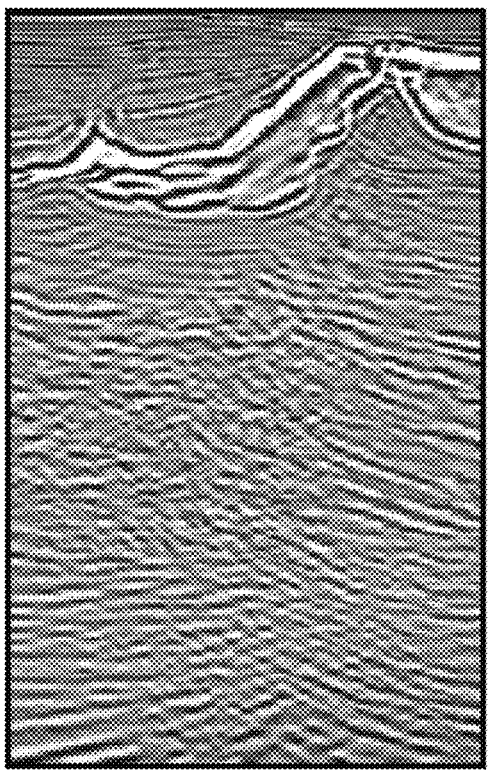
FIG. 13A illustrates one embodiment of a digital seismic image before it is updated and improved in accordance with the disclosure.
Figure 13B:
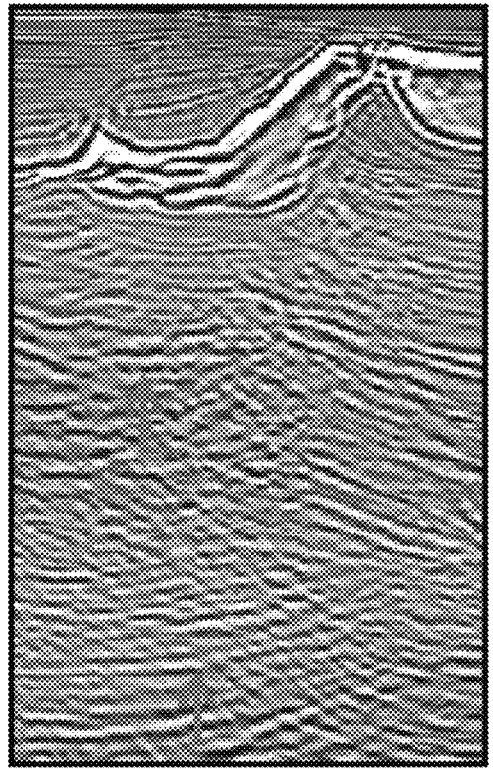
FIG. 13B illustrates one embodiment of the digital seismic image of FIG. 13A after it is updated and improved in accordance with the disclosure.

FIG. 13A illustrates one embodiment of a digital seismic image before it is updated and improved in accordance with the disclosure. FIG. 13B illustrates one embodiment of the digital seismic image of FIG. 13A after it is updated and improved in accordance with the disclosure. Specifically, one iteration of seismic velocity model and three iterations of basin model updates were performed, gradually updating the area of interest from shallow to deep. Several model selection criteria were established based on gather flatness, amplitude stack quality, range of velocity updates, and geologic macro-layers. Limited well information existed in the area of interest and was used for validation purposes. The first basin model iteration showed that high quality horizon interpretations are essential to propagate the effective stress correctly between neighboring basins. After revision of the seismic interpretations, the basin model was rebuilt and adjusted giving pore pressure predictions within the ranges of the validation data. In this case, the seismic velocity model was used to identify inconsistencies in the basin model and to correct these. The second iteration of basin modeling focused on the intermediate depth section above the base of salt providing improved seismic images along steep salt flanks. The third basin model iteration for the subsalt section demonstrated that deeper updates of velocities from basin modeling results add value (but may be challenging under complex salt bodies if the salt evolution is not incorporated appropriately in the basin modeling approach). As a result, the seismic image was improved, in particular, along steep salt flanks and in parts of the subsalt section providing common image gathers with less moveout and seismic images with more continuous reflectors and more focused amplitudes after migration with the hybrid velocity model. The arrows in FIG. 13B point to areas where the seismic image is better focused and shows more continuous reflectors after the hybrid velocity model update and migration.

The integrated basin modeling and seismic imaging approach includes iterative looping between the two models and better constrained effective stress/velocities conversions. As a result, improvement in seismic images and pore pressure prediction from basin models could be observed, which may contribute to improved prospect evaluation, for example, through better structural interpretations and geometry definition. The integrated pore pressure prediction and imaging approach may have most value in young basins where the stress-velocity dependence is most pronounced and in early iterations of the migration velocity analysis. Also, using the integrated approach early in the migration velocity analysis allows the basin model to guide seismic velocity updates in poorly illuminated areas (e.g. steep salt flanks), which helps with velocity updates of deeper model sections. For example, the application of the integrated approach provided improved subsalt sediment velocities and seismic images, but it should be noted that salt interpretation errors often have a similar or larger impact on subsalt image quality than inaccurate sediment velocities. In addition to seismic image improvements, improvements in pore pressure prediction from basin modeling may lead to higher quality of pre-drill pore pressure and effective stress predictions for reservoir and seal quality evaluation, and it may improve the understanding of potential drilling risks.

In short, iterative looping may be utilized to gradually improve seismic velocities, the basin model, the calculated pore pressure, or any combination thereof. Through iterative looping, both seismic velocities and effective stress from the basin model are gradually improved providing better seismic images in poorly illuminated areas. The method 300 may be used for defining and calibrating transform functions that can be used to calculate pore pressure from seismic velocities. Transform functions defined in an area where integrated basin/velocity models exist can be applied to analog areas.

The embodiments disclosed herein are of particular importance in young shale dominated basins and in typical exploration settings with little or no well control. The combined pore pressure prediction and velocity modeling may be most beneficial in areas where velocities are a function of effective stress, for example, in shale-dominated tertiary basins and subsalt areas such as the Gulf of Mexico or offshore West Africa. Also, the basin modeling may provide additional information for velocity modeling in areas where seismic tomography needs guidance due to poor illumination or where diagenetic transitions are critical and their effects need to be incorporated into a seismic velocity model. Moreover, besides improvement of pore pressure predictions and digital seismic images, the embodiments discussed herein may lead to defining more robust seismic transform functions that can be used away from well control and in analog areas.

Figure 14:
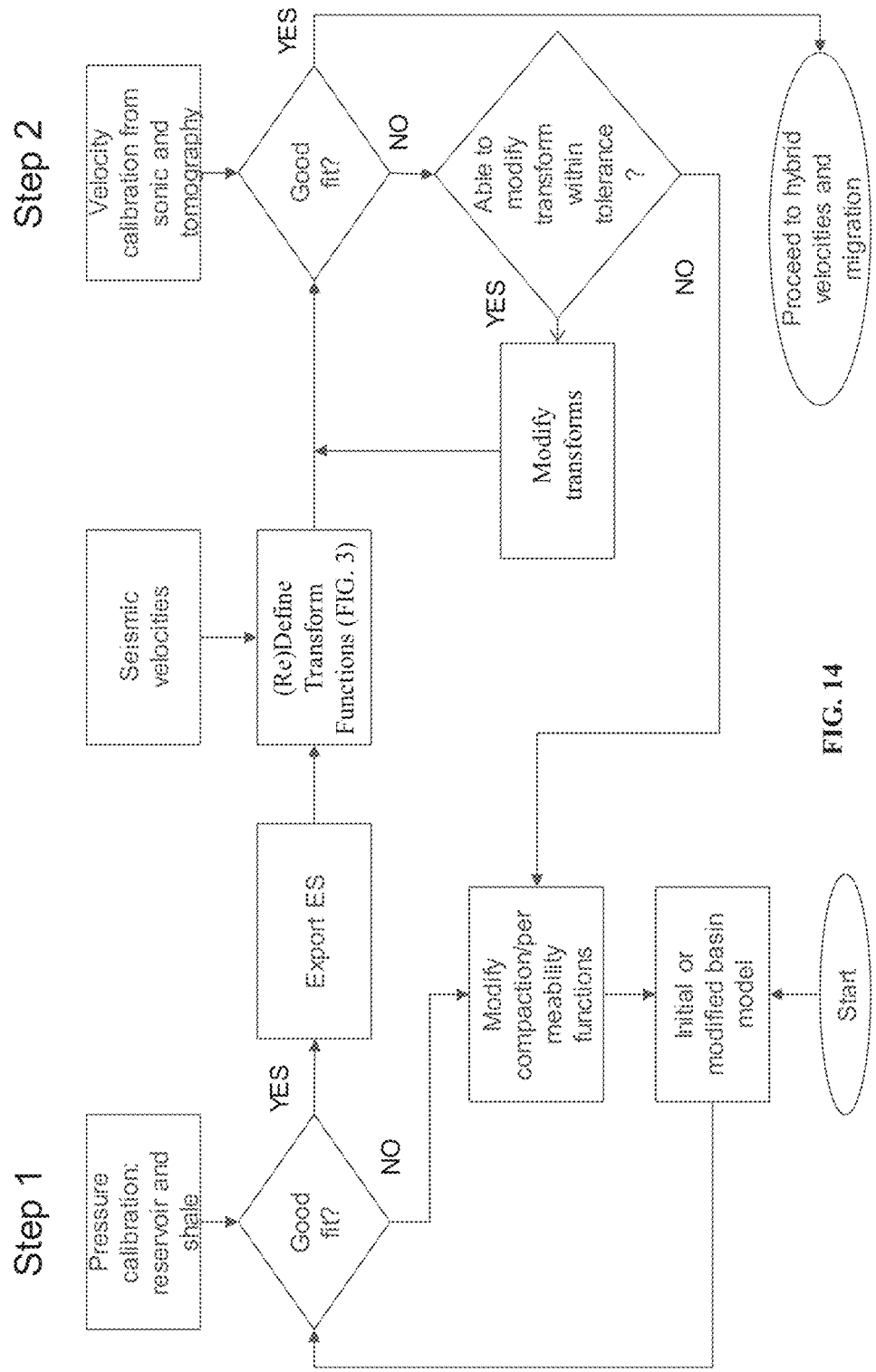
FIG. 14 illustrates one embodiment of a modified basin model calibration method in accordance with the disclosure.
Figure 15A:
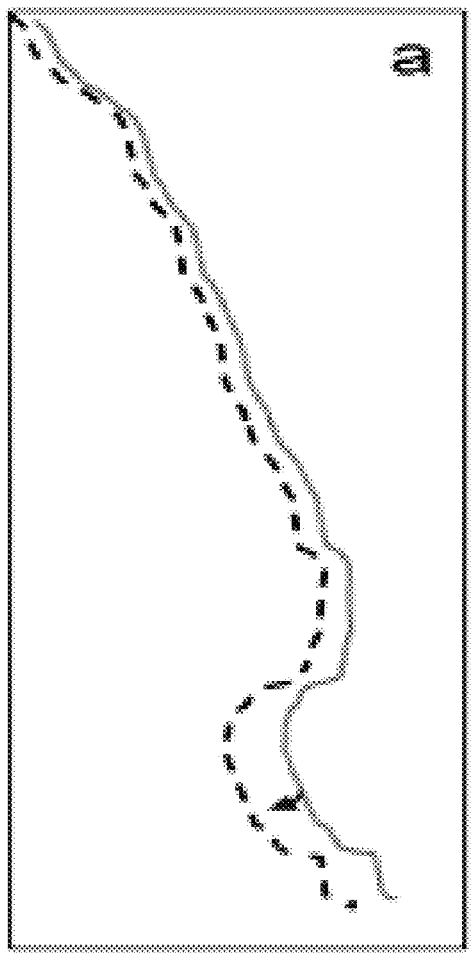
FIG. 15A illustrates one embodiment in which modification is possible in accordance with the disclosure.
Figure 15B:
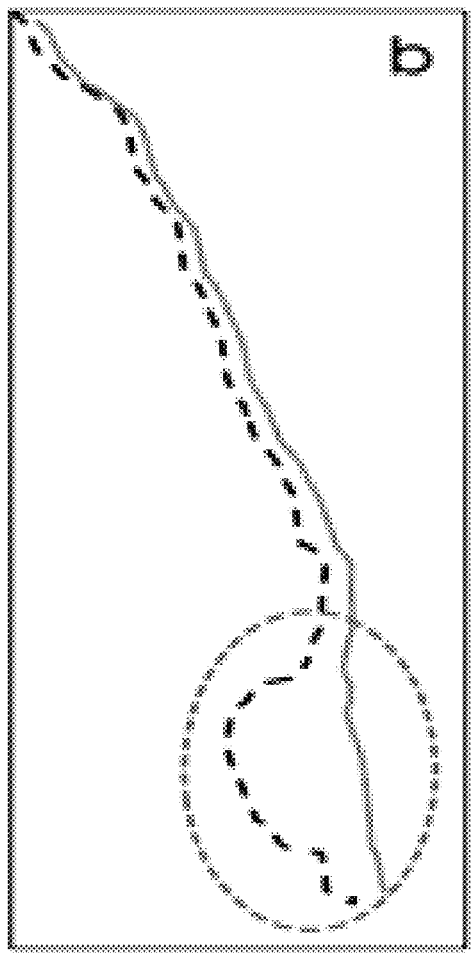
FIG. 15B illustrates one embodiment in which modification is not likely in accordance with the disclosure.

Those of ordinary skill in the art will appreciate that various changes, additions, deletions, or any combination thereof may be made to the embodiments discussed herein. For example, it may be advisable to repeat the method 300 for different parts of the geologic system, e.g., definition of transfer functions for a mini-basin, definition of transfer functions for sub-salt, etc. For example, FIG. 14 illustrates one embodiment of a modified basin model calibration method that includes calibration of stress-to-velocity transforms. In FIG. 14, "(Re)Define Transform Functions" refers to the method 300 in FIG. 3 described herein. In FIG. 14, "Modify Transforms" refers to a modification of the above transforms within an acceptable tolerance range. FIGS. 15A-15B illustrate example scenarios of calibration data (dash line) vs. velocities computed from vertical effective stress using a transform function at a well or a pseudo-well location (solid line). Specifically, in FIG. 15A, modification of the equation is sufficient to fit calibration data. The corrected function is within an acceptable tolerance range.

However, modification is not likely (e.g., not possible) in the example in FIG. 15B (as illustrated by the circular dashed line), which is an indication that the next iteration should include a modification of rock properties in the basin model. Final effective stress-to-velocity transforms can be used for pre-drill pore pressure prediction from seismic velocities or other decisions as discussed herein.

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal languages of the claims, etc. All citations referred herein are expressly incorporated herein by reference. For example, U.S. Pat. No. 9,310,500 (Chevron Docket No. T-9218), with the title "VELOCITY MODELS FOR PROCESSING SEISMIC DATA BASED ON BASIN MODELING" and filed on Feb. 20, 2013, is incorporated herein by reference in its entirety.

The invention claimed is:

1. A method of generating a digital seismic image through integration of seismic data and basin modeling, the method comprising:
    (a) receiving a seismic velocity model;
    (b) receiving a basin model;
    (c) extracting at least one convergence parameter from the seismic velocity model;
    (d) extracting spatial coordinates and seismically derived velocities from the seismic velocity model where the at least one convergence parameter resides within an acceptable threshold corresponding to that convergence parameter;
    (e) extracting effective stress from the basin model at the spatial coordinates;
    (f) crossplotting the seismically derived velocities from the seismic velocity model and the effective stress from the basin model at the spatial coordinates;
    (g) defining seismic transform functions and an uncertainty range from the crossplotting;
    (h) transforming the seismically derived velocities into calculated effective stress using selected seismic transform functions and calculating pore pressure using an equation transforming the calculated effective stress into calculated pore pressure;
    (i) identifying a subset of the selected seismic transform functions that closely reproduce well pressure, reside between hydrostatic pressure and lithostatic pressure, or any combination thereof, wherein the subset is identified in response to the calculated pore pressure being adequate based on a comparison of the calculated pore pressure and validation data, pore pressure derived from the basin model, or any combination thereof;
    (j) using an inverse of the subset to convert the effective stress from the basin model into basin model derived velocities,
    (k) building a hybrid velocity model including a plurality of regions by selecting velocities from the basin model derived velocities using the calculated effective stress and the calculated pore pressure or from the seismically derived velocities in each region; and
    (l) generating a digital seismic image using the hybrid velocity model, wherein the digital seismic image is indicative of quality of the calculated effective stress, the calculated pore pressure, and the derived velocity in each region.

2. The method of claim 1, further comprising modifying the basin model, redefining the seismic transform function and the uncertainty range from the crossplotting, or any combination thereof in response to the calculated pore pressure being inadequate based on the comparison of the calculated pore pressure to the validation data, the pore pressure derived from the basin model, or any combination thereof.

3. The method of claim 1, wherein the defined seismic transform functions from the crossplotting serve as the selected seismic transform functions to transform the seismically derived velocities into the calculated effective stress.

4. The method of claim 1, further comprising determining whether well transform functions exist within the uncertainty range.

5. The method of claim 4, further comprising selecting the defined seismic transform functions that are within a pre-defined distance from the well transform functions in response to determining that the well transform functions exist within the uncertainty range.

6. The method of claim 5, wherein the defined seismic transform functions that are within the pre-defined distance from the well transform functions serve as the selected seismic transform function to transform the seismically derived velocities into the calculated effective stress.

7. The method of claim 1, wherein receiving the seismic velocity model includes building or modifying the seismic velocity model.

8. The method of claim 1, wherein receiving the basin model includes building or modifying the basin model.

9. The method of claim 1, wherein interpretation is evaluated, and optionally reinterpreted, in response to the digital seismic image.

10. The method of claim 1, further comprising determining whether the digital seismic image meets quality criteria, and repeating at least a portion of (a)-(l) in response to determining that the digital seismic image does not meet the quality criteria.

11. The method of claim 10, wherein determining whether the digital seismic image meets the quality criteria includes comparing at least a portion of the digital seismic image with a previously generated digital seismic image.

12. The method of claim 1, further comprising repeating at least a portion of (a)-(i) in response to the calculated pore pressure being inadequate based on the comparison of the calculated pore pressure and the validation data, the pore pressure derived from the basin model, or any combination thereof.

13. The method of claim 1, further comprising using the identified subset of the selected seismic transform functions for analyzing a different subsurface area of interest.

14. The method of claim 1, wherein the digital seismic image is utilized to make at least one decision related to hydrocarbon exploration and production.

15. A system of generating a digital seismic image through integration of seismic data and basin modeling, the system comprising:
a processor; and
a memory communicatively connected to the processor, the memory storing computer-executable instructions which, when executed, cause the processor to perform:
(a) receiving a seismic velocity model;
(b) receiving a basin model;
(c) extracting at least one convergence parameter from the seismic velocity model;
(d) extracting spatial coordinates and seismically derived velocities from the seismic velocity model where the at least one convergence parameter resides within an acceptable threshold corresponding to that convergence parameter;
(e) extracting effective stress from the basin model at the spatial coordinates;
(f) crossplotting the seismically derived velocities from the seismic velocity model and the effective stress from the basin model at the spatial coordinates;
(g) defining seismic transform functions and an uncertainty range from the crossplotting;
(h) transforming the seismically derived velocities into calculated effective stress using selected seismic transform functions and calculating pore pressure using an equation transforming the calculated effective stress into calculated pore pressure;
(i) identifying a subset of the selected seismic transform functions that closely reproduce well pressure, reside between hydrostatic pressure and lithostatic pressure, or any combination thereof, wherein the subset is identified in response to the calculated pore pressure being adequate based on a comparison of the calculated pore pressure and validation data, pore pressure derived from the basin model, or any combination thereof;
(j) using an inverse of the subset to convert the effective stress from the basin model into basin model derived velocities;
(k) building a hybrid velocity model including a plurality of regions by selecting velocities from the basin model derived velocities using the calculated effective stress and the calculated pore pressure or from the seismically derived velocities in each region;
(l) generating a digital seismic image using the hybrid velocity model, wherein the digital seismic image is indicative of quality of the calculated effective stress, the calculated pore pressure, and the derived velocity in each region.

16. The system of claim 15, wherein the computer-executable instructions which, when executed, cause the processor to further perform:
modifying the basin model, redefining the seismic transform function and the uncertainty range from the crossplotting, or any combination thereof in response to the calculated pore pressure being inadequate based on the comparison of the calculated pore pressure to the validation data, the pore pressure derived from the basin model, or any combination thereof.

17. The system of claim 15, wherein the defined seismic transform functions from the crossplotting serve as the selected seismic transform functions to transform the seismically derived velocities into the calculated effective stress.

18. The system of claim 15, wherein the computer-executable instructions which, when executed, cause the processor to further perform:
determining whether well transform functions exist within the uncertainty range.

19. The system of claim 18, wherein the computer-executable instructions which, when executed, cause the processor to further perform:
selecting the defined seismic transform functions that are within a pre-defined distance from the well transform functions in response to determining that the well transform functions exist within the uncertainty range.

20. The system of claim 19, wherein the defined seismic transform functions that are within the pre-defined distance from the well transform functions serve as the selected seismic transform function to transform the seismically derived velocities into the calculated effective stress.

21. The system of claim 15, wherein receiving the seismic velocity model includes building or modifying the seismic velocity model.

22. The system of claim 15, wherein receiving the basin model includes building or modifying the basin model.

23. The system of claim 15, wherein interpretation is evaluated, and optionally reinterpreted, in response to the digital seismic image.

24. The system of claim 15, wherein the computer-executable instructions which, when executed, cause the processor to further perform:
determining whether the digital seismic image meets quality criteria, and repeating at least a portion of (a)-(l) in response to determining that the digital seismic image does not meet the quality criteria.

25. The system of claim 24, wherein determining whether the digital seismic image meets the quality criteria includes comparing at least a portion of the digital seismic image with a previously generated digital seismic image.

26. The system of claim 15, wherein the computer-executable instructions which, when executed, cause the processor to further perform:
repeating at least a portion of (a)-(i) in response to the calculated pore pressure being inadequate based on the comparison of the calculated pore pressure and the validation data, the pore pressure derived from the basin model, or any combination thereof.

27. The system of claim 15, wherein the computer-executable instructions which, when executed, cause the processor to further perform:
using the identified subset of the selected seismic transform functions for analyzing a different subsurface area of interest.

28. The system of claim 15, wherein the digital seismic image is utilized to make at least one decision related to hydrocarbon exploration and production.

29. A computer-readable medium having computer-executable instructions stored thereon which, when executed by a computing system, cause the computing system to perform a method of generating a digital seismic image through integration of seismic data and basin modeling, the method comprising:
(a) receiving a seismic velocity model;
(b) receiving a basin model;
(c) extracting at least one convergence parameter from the seismic velocity model;
(d) extracting spatial coordinates and seismically derived velocities from the seismic velocity model where the at least one convergence parameter resides within an acceptable threshold corresponding to that convergence parameter;

(e) extracting effective stress from the basin model at the spatial coordinates;

(f) crossplotting the seismically derived velocities from the seismic velocity model and the effective stress from the basin model at the spatial coordinates;

(g) defining seismic transform functions and an uncertainty range from the crossplotting;

(h) transforming the seismically derived velocities into calculated effective stress using selected seismic transform functions and calculating pore pressure using an equation transforming the calculated effective stress into calculated pore pressure;

(i) identifying a subset of the selected seismic transform functions that closely reproduce well pressure, reside between hydrostatic pressure and lithostatic pressure, or any combination thereof, wherein the subset is identified in response to the calculated pore pressure being adequate based on a comparison of the calculated pore pressure and validation data, pore pressure derived from the basin model, or any combination thereof;

(j) using an inverse of the subset to convert the effective stress from the basin model into basin model derived velocities;

(k) building a hybrid velocity model including a plurality of regions by selecting velocities from the basin model derived velocities using the calculated effective stress and the calculated pore pressure or from the seismically derived velocities in each region; and (l) generating a digital seismic image using the hybrid velocity model, wherein the digital seismic image is indicative of quality of the calculated effective stress, the calculated pore pressure, and the derived velocity in each region.

* * * * *